United States Patent
Kawashima et al.

(10) Patent No.: US 8,349,916 B2
(45) Date of Patent: Jan. 8, 2013

(54) ACTINIC ENERGY RADIATION CURABLE INK-JET INK, INK-JET RECORDING METHOD, AND PRINTED MATTER

(75) Inventors: Kouki Kawashima, Tokyo (JP); Masaki Nakamura, Tokyo (JP); Atsushi Nakajima, Tokyo (JP); Yusuke Takaku, Tokyo (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 300 days.

(21) Appl. No.: 12/640,104

(22) Filed: Dec. 17, 2009

(65) Prior Publication Data
US 2010/0233446 A1    Sep. 16, 2010

(30) Foreign Application Priority Data
Mar. 11, 2009 (JP) ................... 2009-057846

(51) Int. Cl.
*C09D 11/00* (2006.01)
(52) U.S. Cl. ............ 523/160; 523/161; 428/195.1; 522/181; 427/511
(58) Field of Classification Search .......... 523/160, 523/161
See application file for complete search history.

(56) References Cited

U.S. PATENT DOCUMENTS
2006/0262174 A1* 11/2006 Aoai .................. 347/100

FOREIGN PATENT DOCUMENTS

| EP | 1724315 | 11/2006 |
|---|---|---|
| JP | 314251 | 1/1991 |
| JP | 437856 | 2/1992 |
| JP | 10195356 | 7/1998 |
| JP | 200461876 | 4/2004 |
| JP | 2005146001 | 6/2005 |
| JP | 3821912 | 6/2006 |
| JP | 3893833 | 12/2006 |
| JP | 2007137923 | 6/2007 |
| JP | 2008280460 | 11/2008 |
| WO | 2007029468 | 3/2007 |

OTHER PUBLICATIONS
European Search Report EP 09 25 2871 dated Jun. 25, 2010.
* cited by examiner

*Primary Examiner* — Doris Lee
(74) *Attorney, Agent, or Firm* — Lucas & Mercanti, LLP

(57) ABSTRACT

The present invention provides an actinic energy radiation curable ink-jet ink exhibiting excellent ink storage stability, nozzle ink repellency, and ejection stability, and also exhibiting excellent curability, anti-abrasion properties, solvent resistance, flexibility, weather resistance, and substrate adhesion properties even under various ambience factors and irradiation conditions, as well as an ink-jet recording method and printed matter using the same. In an actinic energy radiation curable ink-jet ink containing a cationically polymerizable compound and a photo-cationic polymerization initiator, an actinic energy radiation curable ink-jet ink wherein a cationically polymerizable compound having a vinyl ether group as a reactive group is contained at 50.0% by mass or more and the halogen ion content is 1.0 μg/g of the ink-100 μg/g of the ink.

12 Claims, 2 Drawing Sheets

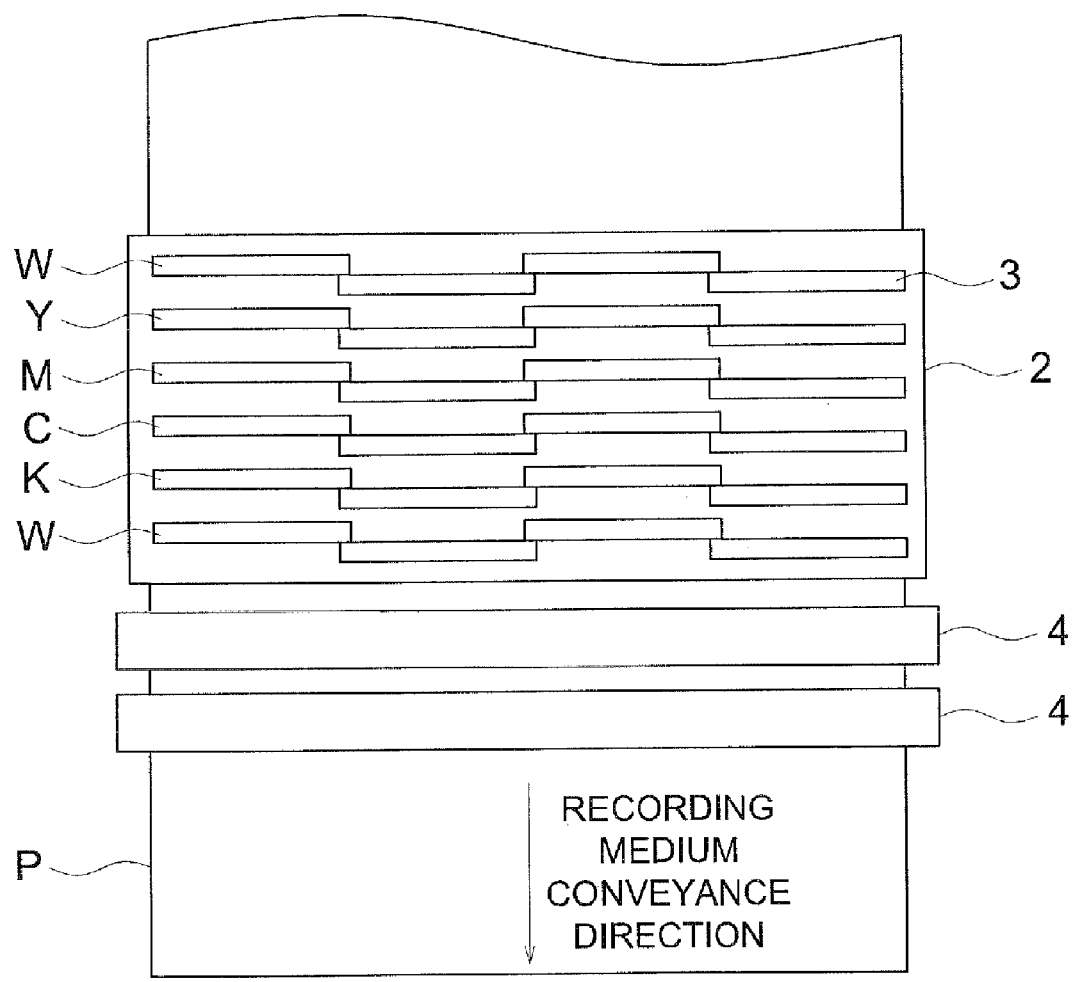

ACTINIC ENERGY RADIATION CURABLE INK-JET INK, INK-JET RECORDING METHOD, AND PRINTED MATTER

CROSS-REFERENCE TO RELATED APPLICATION

This application is based on. Japanese Patent Application No. 2009-057846 filed on Mar. 11, 2009 with Japan Patent Office, the entire content of which is hereby incorporated by reference.

FIELD OF TECHNOLOGY

The present invention relates to a newly-developed actinic energy radiation curable ink-jet ink, an ink-jet recording method, and printed mailer.

TECHNICAL BACKGROUND

Over recent years, due to simple and inexpensive production of images, ink-jet recording systems have been used in a wide variety of printing fields including photograph, various types of printing, marking, and specialty printing such as color filters.

As ink-jet ink used in such ink-jet recording systems, there are various types of ink-jet inks such as aqueous ink containing water as a main solvent, oil-based ink mainly containing a non-volatile solvent which does not volatilize at mom temperature and containing substantially no water, non-aqueous ink mainly containing a solvent which volatiles at mom temperature and containing substantially no water, hot melt ink in which ink, being solid at room temperature, is heat-melted for printing, or actinic energy radiation curable ink-jet ink which is cured with actinic energy radiation such as light after printing. These inks are appropriately used based on the intended purposes. Of these, the actinic energy radiation curable ink-jet ink is characterized by being printed on various printing media due to rapid curability, having thereby received much attention as a next-generation ink-jet ink replacing the aqueous ink, the oil-based ink, and the non-aqueous ink requiring a large drying load and having a limited use of recording media. Therefore, such an actinic energy radiation curable ink-jet ink is an ink-jet ink whose use is expected to expand.

Conventionally, as the actinic energy radiation curable ink-jet ink, there are a radically polymerizable and a cationically polymerizable ink-jet inks. Further, of these, known are a non-solvent-type curable ink-jet ink containing substantially no solvent and a solvent dilution-type curable ink-jet ink of low viscosity positively diluted with water or a solvent. Fundamentally, the actinic energy radiation curable ink-jet ink features quick drying performance. Therefore, there has widely been brought into practical use a non-solvent-type curable ink-jet ink requiring no solvent-drying load during ink-jet recording or a curable ink-jet ink with a slightly added solvent. Of these, the radically polymerizable ink-jet ink features a wide selection of materials, which, thereby, has great flexibility for ink designing and is widely being researched and developed, resulting in being put into practical use. In contrast, the cationically polymerizable ink-jet ink is unaffected by polymerization inhibition caused by oxygen, and thereby has such advantages that excellent small droplet curability and excellent curability with a low energy radiation source are expressed and a relatively highly flexible cured film can be obtained.

Utilizing these advantages, application examples of such an actinic energy radiation curable ink-jet ink are cited as follows.

For example, with regard to printing of outdoor notice boards and advertising boards and printed matter of materials having a curved surface, a large-sized ink-jet printer is used. And as recording media, recording media formed of a plastic such as polyvinyl chloride or polyethylene are used. In these fields, long-term outdoor weather resistance, anti-abrasion properties, and solvent resistance are required. Further, use as rapping advertisement in buses or trains is occasionally done. In this case, printed matter is allowed to adhere to a vehicle body having a curved or an uneven surface. Therefore, a cured film is required to be flexible. As ink droplet size, a relatively large size is used due to large-sized printing, resulting in large film thickness. Therefore, when actinic energy radiation is inadequately transmitted into the interior of the film due to absorption by colorants such as pigments, poor curing occurs, resulting in impaired adhesion to the recording medium. Conventionally, in these fields, a non-aqueous ink-jet ink employing a pigment has been used. However, in use of such a non-aqueous ink-jet ink, printed matter is dried via evaporation of an organic solvent and penetration into the substrate, resulting in safety and odor problems. Accordingly, in recent years, an actinic energy radiation curable ink-jet ink is being applied utilizing its low odor properties and quick drying performance.

An actinic energy radiation curable ink-jet ink is applicable to printing for soft plastic packaging materials, utilizing the feature of printing ability with respect to a non-penetrable substrate. However, in this field, high definition, high image quality, and high productivity are required. Thereby, it is desirable to realize smaller droplets with respect to ink droplets ejected from the ink-jet head, to provide the ink with the ability to respond to thin film printing, and to achieve enhanced curability with no curing inhibition resulting from the ambience. Further, enhanced image quality having no problem of bleeding among droplets is required. Due to use for those held in the user's hand, safety and low odor are also required.

In the fields of various types of printed matter such as newspapers, magazines, books, or small-lot catalogs, a main technology is currently a conventional printing technology such as offset printing. An ink-jet recording system is being considered to be applied due to its features, specifically, such as cost performance in small-lot print run, delivery time shortening, or printability of variable data such as direct mail addressing. In these fields, problems such as printing speed, printing image quality, and drying load are noted. Therefore, the applicability of an actinic energy radiation curable ink-jet ink exhibiting quick drying performance and high ejection stability is expected. With the popularization of CTP (Computer to Plate) systems, plate images of a printing plate are also expected to be produced via an ink-jet system employing an actinic energy radiation curable ink-jet ink. Also in this case, required are realization of smaller droplet size, high image quality by a thinner film, reliability of ink-jet ejection, and printing durability.

As just described, with regard to an actinic energy radiation curable ink-jet ink, a fundamental technology having high general versatility is expected to be established to respond to a wide variety of demands such as various droplet sizes, recording media, printed matter size, printed film thickness, and various performing properties such as weather resistance, anti-abrasion properties, solvent resistance, flexibility, safety, odorless properties during printing, odorless properties of printed matter, or low running cost.

As a cationically polymerizable ink-jet ink composition, those, in which an oxetane compound, an alicyclic epoxy compound, or a vinyl ether compound is used as a polymerizable compound, are widely known (for example, refer to Patent Documents 1 and 2). In any of the ink-jet ink compositions disclosed therein, the added amount of an alicyclic epoxy compound is needed to increase to realize adequate curing sensitivity, which, thereby, has produced problems such as an increase in ink viscosity or a decrease in flexibility of a cured film. From the viewpoint of realizing ink viscosity reduction and flexibility of a cured film, a vinyl ether compound is a useful monomer due to its relatively low viscosity, as well as low glass transition point of a cured film. Therefore, actinic energy radiation curable ink-jet inks containing vinyl ethers are proposed and disclosed (for example, refer to Patent Documents 2-7).

In Patent Document 7, an image forming method which performs curing with an LED light source is disclosed in which an ink-jet ink containing a vinyl ether compound, a pigment, a disperser, a diallyl phthalate prepolymer, a cationic polymerization initiator, and a sensitizer are used. In the ink used herein, a vinyl ether compound of low viscosity is mainly contained, and also a prepolymer and a sensitizer are combined, whereby it is conceivable that the ink can exhibit lower viscosity, and excellent curing characteristics can be realized even using a long wavelength light source such as an LED. However, this type of ink is easily affected by humidity in air under the printing ambience. And when a light source of low illuminance such as a low pressure mercury lamp is used, under conditions where small droplets are singly arranged on a recording medium using an ink-jet system, effects, specifically, of humidity in air are easily produced, resulting in inadequate curing and poor drying which produce inadequate solvent resistance and anti-abrasion properties of a cured film. Thereby, a problem has been produced in which the light source used for curing is limited. Further, with regard to this ink-jet ink; when the ink is stored under a high temperature ambience, viscosity is increased, and in contrast, in the case of storage under a low temperature ambience, deposits tend to be generated, which has made it clear that a problem is noted in ink storage. Still further, when ink-jet ejection is repeated, the liquid repellency of the ink-jet nozzles is decreased, resulting in deposits near the nozzles, which has made it clear that there is also a problem in ejection stability.

On the other ham it is well known that in an ink-jet ink, especially, in an aqueous ink-jet ink employing water as a solvent, an inorganic salt such as sodium chloride causes corrosion of an ink-jet heat member and deposition of a colorant during ink storage. Further, it is known that even with regard to a non-aqueous ink-jet ink, chlorine ions contained in the ink induce corrosion of a liquid contact portion (for example, refer to Patent Document 8). Still further, a technology is disclosed in which in a cationically polymerizable composition, in order to ensure long-term storage stability with no inhibition of curability, the contents of cationic impurities, metal impurities, and strong-acid substances are specified (for example, refer to Patent Document 9). However, in the ink described in Patent Document 9, at present, poor curability and storage stability, specifically, poor liquid repellency of the ink-jet nozzles is expressed, and in addition, performance such as weather resistance or film flexibility is inadequately expressed.

In this manner, in an actinic energy radiation curable ink-jet ink, a highly robust ink-jet ink is being sought, in which curing thereof tends not to be affected by ambience factors (e.g., temperature, humidity, and oxygen) and by irradiation conditions (e.g., long time exposure with a low illuminance light source, short time irradiation with a high illuminance light source, and long wavelength exposure with an LED); and excellent curing can be carried out even using a small droplet size and a thin film and also excellent curing, reaching the interior of the film, can be performed even using a large droplet size and a thick film. Especially, it is critical that adverse effects by the humidity in air tend not to be produced under such conditions that ink-jet ink droplets are singly arranged on a recording medium at a low illuminance. In addition thereto, it is necessary to satisfy performing properties such as weather resistance, anti-abrasion properties, solvent resistance, flexibility, safety, odorless properties during printing, odorless properties of printed matter, low running cost, ink storage stability, and ejection stability.

[Patent Document 1] Japanese Patent Publication No. 3014251

[Patent Document 2] Japanese Patent Publication No. 3893833

[Patent Document 3] Japanese Patent Publication No. 3821912

[Patent Document 4] Japanese Patent Publication No. 4061876

[Patent Document 5] Japanese Patent Publication No. 4037856

[Patent Document 6] Unexamined Japanese Patent Application Publication (hereinafter referred to as JP-A) No. 2007-137923

[Patent Document 7] JP-A No. 2008-280460

[Patent Document 8] JP-A No. 10495356

[Patent Document 9] JP-A No. 2005-146001

SUMMARY

In view of the above problems, the present invention was completed. An object of the present invention is to provide a highly robust actinic energy radiation curable ink-jet ink in which with minimal adverse effects of ambience factors (e.g., temperature, humidity, and oxygen) and of irradiation conditions (e.g., long time exposure with a low illuminance light source, short time irradiation with a high illuminance light source, and long wavelength exposure with an LED), excellent curing can be carried out even using a small droplet size and a thin film and also excellent caring, reaching the interior of the film, can be performed even using a large droplet size and a thick film; and especially, the object is to provide an actinic energy radiation curable ink-jet ink in which ink-jet droplets tend not to be adversely affected by the humidity in air under conditions where the droplets are singly arranged on a recording medium at a low illuminance, and in addition, satisfied are weather resistance, anti-abrasion properties, solvent resistance, flexibility, substrate adhesion properties, safety, odorless properties during printing, odorless properties of printed matter, low running cost, ink storage stability, and ejection stability, as well as to provide an ink-jet recording method and printed matter using the same.

The object of the present invention can be achieved by the following constitution.

1. An actinic energy radiation curable ink-jet ink comprising a cationically polymerizable compound and a photo-cationic polymerization initiator, wherein a content of the cationically polymerizable compound having a vinyl ether group as a reactive group is 50.0% or more by mass and a content of a halogen ion is 1.0 µg/g ink or more and 100 µg/g ink or less.

2. The actinic energy radiation curable ink-jet ink of item 1, wherein the content of the halogen ion is 1.0 µg/g ink or more and 40 µg/g ink or less.

3. The actinic energy radiation curable ink-jet ink of item 1, wherein the content of the halogen ion is 1.0 µg/g ink or more and 10 µg/g ink or less.
4. The actinic energy radiation curable ink-jet ink of any one of items 1 to 3, therein the content of the cationically polymerizable compound having a vinyl ether group as a reactive group is 80.0% or more by mass.
5. The actinic energy radiation curable ink-jet ink of any one of items 1 to 4 comprising a radical polymerization inhibitor.
6. A method for an inkjet recording comprising steps of:
   jetting the actinic energy radiation curable inkjet ink of any one of items 1 to 5 from an inkjet nozzle on a recording media; and
   curing the actinic energy radiation curable ink-jet ink by irradiating the actinic energy ray.
7. A printed matter recorded by the method for the inkjet recording of item 6.

The present invention made it possible to provide an actinic energy radiation curable ink-jet ink exhibiting excellent ink storage stability, nozzle ink repellency, and ejection stability, as well as exhibiting excellent curability, anti-abrasion properties, solvent resistance, flexibility, weather resistance, and substrate adhesion properties even under various ambience factors and irradiation conditions; and an ink-jet recording method and printed matter using the same.

BRIEF DESCRIPTION OF THE DRAWINGS

[FIG. 2] A top view showing another example of the constitution of a main section of an ink-jet recording apparatus used in the ink-jet recording method of the present invention

DESCRIPTION OF THE ALPHANUMERIC DESIGNATIONS

Figure 1:
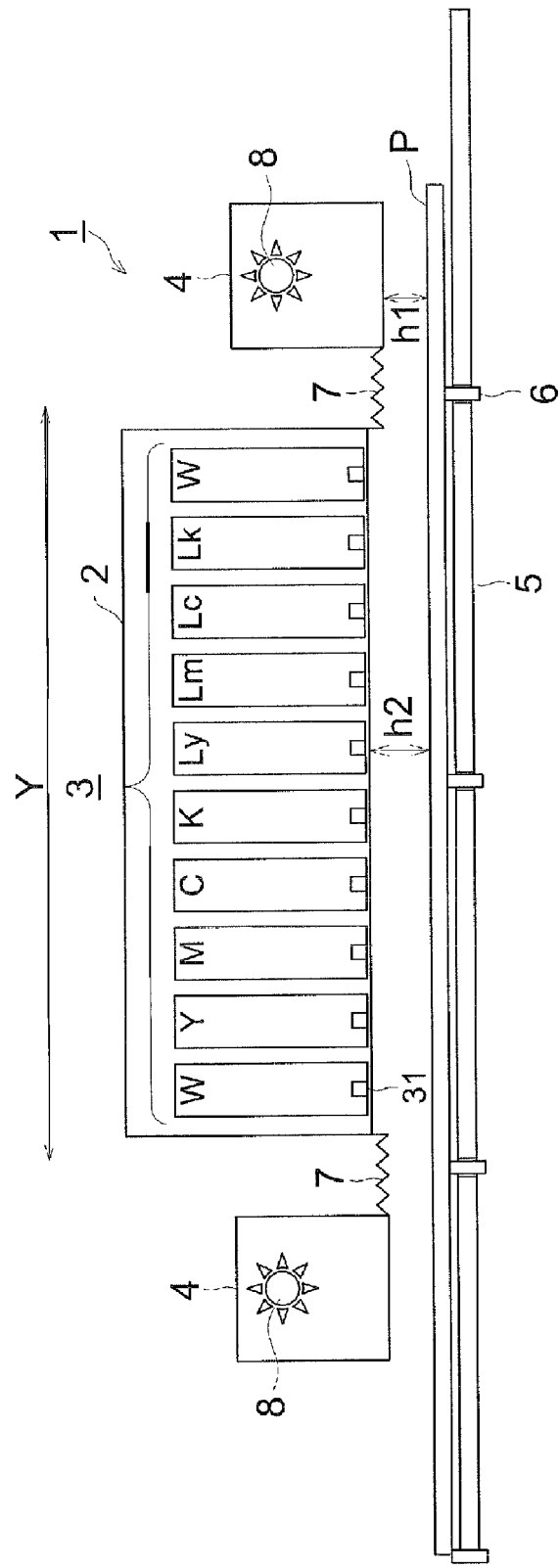
[FIG. 1] A front elevation view showing an example of the constitution of a main section of an ink-jet recording apparatus used in the ink-jet recording method of the present invention

| | |
|---|---|
| 1: | recording apparatus |
| 2: | head carriage |
| 3: | recording head |
| 31: | ink ejection orifice |
| 4: | irradiation member |
| 5: | platen section |
| 6: | guide member |
| 7: | bellows structure |
| 8: | irradiation source |
| P: | recording medium |

THE BEST EMBODIMENT FOR EMBODYING THE INVENTION

An embodiment to carry out the present invention will now be detailed.

In view of the above problems, the present inventors conducted diligent investigations, and thereby found that in an actinic energy radiation curable ink-jet ink containing a cationically polymerizable compound and a photo-cationic polymerization initiator, using an actinic energy radiation curable ink-jet ink in which a cationically polymerizable compound having a vinyl ether group as a reactive group is contained at 50.0% by mass or more and the halogen ion content is 1.0 µg/g of the ink-100 µg/g of the ink, an actinic energy radiation curable ink-jet ink was able to be realized exhibiting excellent ink storage stability, nozzle ink repellency, and ejection stability, as well as exhibiting excellent curability, anti-abrasion properties, solvent resistance, flexibility, weather resistance, and substrate adhesion properties even under various ambience factors and irradiation conditions.

Namely, the present inventors conducted detailed investigations on effects of halogen ion concentration on the curability of a cationically polymerizable compound, and thereby found that the curability of an actinic energy radiation curable ink-jet ink (hereinafter also referred to as an ink-jet ink or simply as an ink) mainly employing a compound having a vinyl ether group as a reactive group was able to be improved dramatically by allowing the halogen ion concentration to be 1.0 µg/g of the ink-100 µg/g of the ink. Namely, under conditions where the halogen ion content was more than 100 µg/g of the ink, the curability of an ink mainly employing a compound having a vinyl ether group as a reactive group was degraded, and especially, when a thin film was cured using a low illuminance light source, such poor curing was pronounced, which was inferior to an ink mainly employing another cationically polymerizable compound. The present inventors paid attention to the halogen ion content and then conducted further detailed investigations on conditions therefor. Thereby, it was found that when the halogen ion content was allowed to fall within the range specified above, enhanced curability, which was not realized in an actinic energy radiation curable ink-jet ink mainly employing another cationically polymerizable compound even at the same halogen ion content, was realized; namely, even when a thin film was cured under low illuminance conditions, an excellent cured material was obtained. Namely, it was found that in such an ink mainly employing a compound having a vinyl ether group as a reactive group, a critical value between the halogen ion content and curability existed, which did not exist in an ink mainly employing another cationically polymerizable compound. Then, use of this ink made it possible to stably obtain a cured film, regardless of various ambience and irradiation conditions. Simultaneously, such a cured film formed via an ink-jet recording method was found to exhibit enhanced weather resistance, anti-abrasion properties, solvent resistance, and flexibility. Further, it was found that excellent effects was expressed with respect to safety, odorless properties during printing and odorless properties of printed matter, and additionally, excellent storage stability over time of an ink-jet ink was exhibited. Thus, the present invention was achieved.

When an ink-jet ink containing a pigment is cured via actinic energy radiation irradiation, the pigment itself absorbs actinic energy radiation, resulting in opacifying, whereby inadequate actinic energy radiation reaches the deep portion of an ink coated film. Thereby, poor curing occurs in the vicinity of the contact surface between the ink coated film and the substrate, resulting in a serious problem such that adhesion properties between the substrate and the ink coated film are impaired.

A polymerizable compound having a vinyl ether group (hereinafter referred to as a VE compound) as a reactive group is characterized by being reactive; by exhibiting relatively low acid strength (pKa) required for curing, and by being cured even in the presence of a Lewis acid, compared to other cationically polymerizable compound (e.g., an oxetane compound or an oxirane compound).

In contrast, a halogen ion acts as a Lewis acid in the coexistence with a heavy metal (a d-orbital element) as a counter ion.

A constitution, in which an actinic energy radiation curable ink-jet ink containing a VE compound according to the present invention as a main monomer contains an appropriate amount of a halogen ion and the counter cation contains no heavy metal, makes it possible that no Lewis acid exists during ink storage, resulting in no polymerization, but when a heavy metal penetrates an ink from the outside, the ink becomes polymerizable.

In this case, generally, most substrates used in printing with an ink-jet ink frequently contain heavy metals as impurities or additives. It was found that when an ink-jet ink was ejected to any of these substrates and was brought into contact with the substrate, halogen ions in the ink and heavy metals on the substrate surface generated Lewis acids on the contact surface between the ink and the substrate, resulting in polymerization, whereby ink curability was dramatically enhanced on the substrate contact surface. With regard to such a phenomenon, in a conventional ink containing an oxetane compound or an epoxy compound, no polymerization induced by a Lewis acid is noted.

The effects described above make it possible that using an ink-jet ink containing a VE compound as a main component and an appropriately added amount of a halogen, curing is induced by a Lewis acid and then poor curing is prevented, resulting in adequate substrate adhesion properties, even when inadequate actinic energy radiation reaches the vicinity of the contact surface between the substrate and the ink coated film due to the opacifying effect by a pigment.

Such an effect can markedly be produced in cases of large film thickness, high pigment concentration, and a pigment with large UV absorption, specifically in cases of K (black) ink and C (cyan) ink.

Incidentally, as described above, when a halogen ion is excessively contained, the acid strength of a Bronsted acid generated via actinic energy radiation irradiation is weaken since this acid becomes a hydrohalic acid due to the presence of the halogen ion, resulting in poor curing. Therefore, in the halogen amount, an appropriate upper limit exists.

Further, a VE compound exhibits enhanced hydrophobic properties and excellent orientation with respect to a resin substrate, compared to other cationically polymerizable compounds. Therefore, due to this effect, such a VE compound is present on the contact surface with the substrate at a higher rate, whereby polymerization by a Lewis acid, being a targeted effect of the present invention, can favorably be induced.

Each of the constituent elements of the actinic energy radiation curable ink-jet ink of the present invention will now be detailed.

<<Canonically Polymerizable Compounds>>

Generally, in an actinic energy radiation curable ink-jet ink, a vinyl ether compound, an epoxy compound, or an oxetane compound is used as a cationically polymerizable compound. However, one of the features of the present invention is that as a cationically polymerizable compound, a polymerizable compound VE (vinyl ether compound VE) having at least a vinyl ether group as a reactive group is contained in the ink-jet ink at 50% by mass or more.

A vinyl ether compound according to the present invention can be represented by following Formula (VE).

$$R_1\text{—CH}\!=\!\text{CHO—}R_2\text{—X} \quad \text{Formula (VE)}$$

In Formula (VE), $R_1$ represents a hydrogen atom or a substituent, $R_2$ represents a divalent linking group, and X represents a hydroxyl group or a halogen atom.

As the substituent represented by $R_1$, listed are, for example, a straight-chained, branched, or cyclic alkyl group of a carbon number of 1-10, a halogenated alkyl group of a carbon number of 1-10, and an aromatic group of a carbon number of 6-11.

The linking group represented by $R_2$ is not specifically limited, including for example, a straight-chained, branched, or cyclic alkylene group of a carbon number of 2-20, an alkylene group of a carbon number of 2-20 having an oxygen atom via ether or ester bonding in the molecule, and a substituted or unsubstituted aromatic group of a carbon number of 6-11.

Typical examples of the vinyl ethers represented by Formula (VE) include, for example, hydroxyl group-containing vinyl ethers such as 2-vinyloxy ethanol, 2-(or 3-)vinyloxy propanol, 2-(or 4-) vinyloxy butanol, 6-vinyloxy hexanol, 2-(vinyloxyethoxy)ethanol, 2-(vinyloxy-i-propoxy)propanol, 2-(vinyloxyethoxy)-i-propanol, 2-(vinyloxyethoxyethoxy)ethanol, polyethylene glycol monovinyl ether, or polypropylene glycol monovinyl ether, and halogen-containing vinyl ethers such as 1-chloro-2-vinyloxyethane, 1-chloro-3-vinyloxypropane, 1-chloro-4-vinyloxybutane, 1-chloro-6-vinyloxyhexane, 1-chloro-2-(vinyloxy-i-propoxy)ethane, 1-chloro-2-(vinyloxyethoxy)propane, 1-chloro-2-(vinyloxyethoxy)-i-propane, 1-chloro-2-(vinyloxyethoxyethoxy)ethane, 1-chloro-2-(vinyloxypolyethoxy)ethane, 1-chloro-2-(vinyloxypoly-i-propoxy)ethane.

Specific examples of other vinyl ether compounds are as follows:

Polyethylene glycol divinyl ether, polypropylene glycol divinyl ether, poly(meth)acrylic acid 2-vinyloxyethyl ester, poly(meth)acrylic acid 3-vinyloxypropyl ester, poly(meth)acrylic acid 4-vinyloxybutyl ester, phenol novolac resin vinyl ether, cresol novolac resin vinyl ether, ethylene glycol bis(2-vinyloxypolyethoxy)ethyl ether, ethylene glycol bis(2-vinyloxypoly-i-propoxy)ethyl ether, diethylene glycol bis(2-vinyloxypolyethoxy)ethyl ether, triethylene glycol bis(2-vinyloxypolyethoxy)ethyl ether, propylene glycol bis(2-vinyloxypolyethoxy)ethyl ether, dipropylene glycol bis(2-vinyloxypolyethoxy)ethyl ether, butane diol bis(2-vinyloxypoly-i-propoxy)ethyl ether, hexane diol bis(2-vinyloxypolyethoxy)ethyl ether, cyclohexane dimethanol bis (2-vinyloxypoly-i-propoxy)ethylether, trimethylolpropane tri(2-vinyloxypolyethoxy)ethyl ether, 1,1,1-tri(4-vinyloxyphenyl)ethane, 1-[α-methyl-α-(4-vinyloxyphenyl)ethyl]-4-[α,α-bis(4-vinyloxyphenyl)ethyl]benzene, and 1,3-bis(4-vinyloxyphenylsulfonylmethyl)benzene.

Vinyl ether compounds also suitably used are as follows:

n-Propyl vinyl ether, isopropyl vinyl ether, n-butyl vinyl ether, isobutyl vinyl ether, 2-ethylhexyl vinyl ether, octadecyl vinyl ether, cyclohexyl vinyl ether, allyl vinyl ether, hydroxyethyl vinyl ether, hydroxybutyl vinyl ether, 9-hydroxynonyl vinyl ether, 4-hydroxycylohexyl vinyl ether, cyclohexane dimethanol monovinyl ether, triethylene glycol monovinyl ether, 1,4-butane diol divinyl ether, nonane diol divinyl ether, cyclohexane diol divinyl ether, cyclohexane dimethanol divinyl ether, triethylene glycol divinyl ether, trimethylolpropane trivinyl ether, pentaerythritol tetravinyl ether, and ethylene oxide-modified trimethylolpropane trivinyl ether.

Other than the above, various types of vinyl ether compounds having been disclosed so far are applicable. Listed are, for example, the compounds containing a (meth)acryloyl group and a vinyl ether group in the molecule disclosed in Japanese Patent Publication No. 3461501; the vinyl ether compounds having an alicyclic skeleton containing at least an oxygen atom disclosed in Japanese Patent Publication No. 4037856; the vinyl ethers having an alicyclic skeleton disclosed in JP-A No. 2005-015396; 1-indanyl vinyl ether disclosed in JP-A No. 2008-137974; and 4-acetoxycyclohexyl vinyl ether disclosed in JP-A No. 2008-150341.

Of these vinyl ether compounds, in view of curability, adhesion properties, and surface hardness, di- or trivinyl ether compounds are preferable but divinyl ether compounds are specifically preferable. Of these, diethylene glycol divinyl ether and triethylene glycol divinyl ether are preferable due to the excellence in curability, compatibility with various materials, odorless properties, and safety. The total content of diethylene glycol divinyl ether and triethylene glycol divinyl ether is preferably at least 40% by mass based on the total amount of polymerizable compounds, more preferably 60% by mass. Further, any of the above-described other vinyl ether compounds may be used in appropriate combinations. In the present invention, such a vinyl ether compound is characterized by being contained in the ink-jet ink of the present invention at 50% by mass or more. The compound is more preferably contained in the ink-jet ink at 80% by mass or more. When the content of the vinyl ether compound in the ink-jet ink is at least 50% by mass, characteristic effects of the present invention can be produced, in which critical properties of the halogen ion content and curability are expressed, namely, enhanced curability realized with a halogen ion content of at most 100 µg/g of the ink, or curability realized especially when a thin film is cured at low illuminance can be realized.

(Other Cationically Polymerizable Compounds)

In the ink-jet ink of the present invention, together with a polymerizable compound having a vinyl ether group according to the present invention serving as a reactive group, another cationically polymerizable compound, for example, an epoxy compound or an oxetane compound can be used to the extent that the targeted effects of the present invention are not impaired.

<Epoxy Compounds>

As epoxy compounds, any monomers, oligomers, and polymers commonly used for epoxy resins are usable. Specifically, well-known aromatic epoxides, alicyclic epoxides, and aliphatic epoxides are listed. Herein, the epoxides refer to monomers or oligomers thereof. These compounds may be used individually or in combinations of at least 2 types.

As the aromatic epoxides, listed are di- or polyglycidyl ethers produced via reaction of a polyphenol having at least one aromatic nucleus or an alkylene oxide adduct thereof with epichlorohydrin. For example, cited are di- or polyglycidyl ethers of bisphenol A or an alkylene oxide adduct thereof di- or polyglycidyl ethers of hydrogenated bisphenol A or an alkylene oxide adduct thereof and novolac-type epoxy resins. Herein, as the alkylene oxide, ethylene oxide and propylene oxide can be listed.

As the alicyclic epoxides, listed are cyclohexene oxide- or cyclopentene oxide-containing compounds obtained by epoxidizing compounds having at least one cycloalkane ring, such as cyclohexene or cyclopentene using an appropriate oxidant such as hydrogen peroxide or a peracid. Specific examples thereof include, for example, Celloxide 2021, Celloxide 2021A, Celloxide 2021P, Celloxide 2080, Celloxide 2000, Epolead GT301, Epolead GT302, Epolead GT401, Epolead GT403, EHPE-3150, EHPEL 3150CE (produced by Daicel Chemical Industries, Ltd.); and UVR-6105, UVR-6110, UVR-6128, UVR-6100, UVR-6216, and UVR-6000 (produced by Union Carbide Corp.).

The aliphatic epoxides include, for example, di or polyglycidyl ethers of an aliphatic polyol or an alkylene oxide adduct thereof. Typical examples thereof include diglycidyl ethers of alkylene glycols such as ethylene glycol diglycidyl ether, propylene glycol diglycidyl ether, or 1,6-hexane diol diglycidyl ether; polyglycidyl ethers of polyols such as di- or triglycidyl ethers of glycerin or an alkylene oxide adduct thereof; and diglycidyl ethers of polyalkylene glycols such as diglycidyl ethers of polyethylene glycol or an alkylene oxide adduct thereof or diglycidyl ethers of polypropylene glycol or an alkylene oxide adduct thereof. Herein, as the alkylene oxides, ethylene oxide and propylene oxide can be listed.

Further, other than these compounds, monoglycidyl ethers of higher aliphatic alcohols and monoglycidyl ethers of phenol or cresol are usable. Of these epoxides, in view of quick curability, aromatic epoxides and alicyclic epoxides can be used. Of these, alicyclic epoxides are preferable.

Any of these epoxy compounds can be blended in an ink containing a vinyl ether compound according to the present invention in the range of 0-20% by mass, which is preferable from the viewpoint of curability, cured film flexibility, and substrate adhesion properties.

<Oxetane Compounds>

An oxetane compound is a compound having at least one oxetane (trimethylene oxide) ring in the molecule. Specifically, there can preferably used 3-ethyl-3-hydroxymethyloxetane (OXF101, produced by Toagosei Co., Ltd.), 1,4-bis[(3-ethyl-3-oxetanyl)methoxymethyl]benzene (OXT121, produced by Toagosei Co. Ltd.), 3-ethyl-3-(phenoxymethyl)oxetane (OXT211, produced by Toagosei Co. Ltd.), di(1-ethyl-3-oxetanyl)methyl ether (OXT221, produced by Toagosei Co. Ltd.), 3-ethyl-3-(2-ethylhexyloxymethyl)oxetane (OXT212, produced by Toagosei Co. Ltd.), and di(1-methyl-3-oxetanyl)methyl ether. Specifically preferable are 3-ethyl-3-hydroxymethloxetane, 3-ethyl-3-(phenoxymethyl)oxetane, and di(1-ethyl-3-oxetanyl)methyl ether. These can be used individually or in combinations of at least 2 types. Any of these oxetane compounds can be blended in an ink containing a vinyl ether compound according to the present invention in the range of 0-35% by mass, which is preferable from the viewpoint of curability, eared film flexibility, and substrate adhesion properties.

In addition, as such a cationically polymerizable compound, a well-known cationically polymerizable cyclic compound may be contained, in addition to a vinyl ether compound, an epoxy compound, or an oxetane compound according to the present invention. Herein, in the present invention, a vinyl ether compound, an epoxy compound, and an oxetane compound according to the present invention, and also other cyclic compounds are referred to as cationically polymerizable compounds.

<<Polymers or Oligomers>>

In the present invention, polymers or oligomers can be contained or added. As specific polymers or oligomers, of polymers or oligomers of the above cationically polymerizable compounds, in addition to those having no reactive group, those having excellent solubility with respect to a polymerizable compound, mainly a vinyl ether, according to the present invention can be used by selecting one from well-known polymers compatible with such a vinyl ether such as polyurethane-based compounds, poly(meth)acrylic acid (ester)-based compounds, polyester-based compounds, polystyrene-based compounds, polyvinyl acetate-based compounds, polybutadiene-based compounds, polybutyral-based compounds, or polyethylene-based compounds.

It is preferable that the solubility of a polymer or an oligomer with respect to the entire cationically polymerizable compound be at least 5% by mass at −15° C. and the viscosity be at least 500 mPa·s at 25° C.

Addition of such a polymer or an oligomer makes it possible to obtain an ink exhibiting excellent continuous ejection stability during high frequency driving; realizing enhanced cured film flatness, and gloss and high image density, and forming an image excelling in substrate adhesion properties, flexibility, and weather resistance. These effects are markedly expressed specifically in black ink and white ink exhibiting relatively low transmission properties with respect to actinic energy radiation.

In case where the solubility of the polymer or oligomer is not at least 5% by mass based on the entire cationically polymerizable compound at −15° C., when an ink is stored at a low temperature between about 0° C. and 10° C., unfavorable generation of polymer gel or polymer precipitation results and at the same time, effects to enhance ink ejection stability, cured film flexibility, and weather resistance tend not to be produced.

To enhance solubility to the entire cationically polymerizable compound, an ether structure such as an oxyethylene group or an oxypropylene group is allowed to be contained at least as a constituent element. Such a structure makes it possible to enhance solubility with respect to a vinyl ether and also solubility of a photopolymerization initiator, resulting in improved storage properties and curability of an ink.

Further, the viscosity of the polymer or oligomer is preferably at least 500 mPa·s at 25° C., which, thereby, makes it possible to obtain an ink exhibiting excellent continuous ejection stability during high frequency driving realizing enhanced cured film flatness, and gloss and high image density; and excelling in substrate adhesion properties, flexibility, and weather resistance. In the case of at most 500 in mPa·s, adequate effects for substrate adhesion properties and weather resistance tend not to be expressed. The added amount of the polymer or oligomer is appropriately determined based on the viscosity and solubility, and is preferably 3-30% by mass based on the total ink mass, more preferably 5-20% by mass. When the added amount is less than 3% by mass, no above effects are produced. In the case of more than 30% by mass, effects to enhance ejection stability and ink storage stability at low temperatures tend not to be produced.

<<Halogen Ions>>

In the ink-jet ink of the present invention, the content of a halogen ion is characterized to be 1.0 μg/g of the ink-100 μg/g of the ink. The content is more preferably 1.0 μg/g of the ink-40 μg/g of the ink, still more preferably 1.0 μg/g of the ink-10 μg/g of the ink. When the content of the halogen ion exceeds 100 μg/g of the ink, as described above, curability, specifically, curing when a thin film is cured at low illuminance may become incomplete. The investigation of the present inventors made it clear that this phenomenon specifically occurred in an ink mainly employing a vinyl ether compound, compared to other cationically polymerizable compounds. Thereby, this phenomenon results in producing disadvantages such that solvent resistance and anti-abrasion properties of a film are weaken and weather resistance are degraded due to relatively low polymerization degree.

As the halogen ion, a fluorine ion, a chlorine ion, a bromine ion, and an iodine ion are listed, but a chlorine ion and a bromine ion specifically produce relatively large effects. Especially, effects produced by a chlorine ion are large. A chlorine ion and a bromine ion, especially a chlorine ion produces an adverse effect specifically on the above degradation of curability of an ink mainly employing a vinyl ether, resulting in degraded solvent resistance, anti-abrasion properties, and weather resistance. In order to allow the content of such halogen ions in an ink to be 1.0 μg/g of the ink-100 μg/g of the ink, purification operations need to be sufficiently carried out to eliminate halogen ions contained in a cationically polymerizable compound, a colorant, a photo-cationic polymerization initiator, and other additives serving as raw materials. Especially when a pigment is used as a colorant, halogen ions are occasionally contained as impurities, to which therefore attention should be paid. Further, chlorine ions and bromine ions, significantly affecting an ink mainly employing a vinyl ether compound, are frequently incorporated in these raw materials as impurities. As a purification method to eliminate halogen ions float raw materials, various types of methods are employable depending on the forms and properties of the raw materials, including for example, distillation for liquid polymerizable compounds, sublimation for solids, washing with ion-exchange water and drying, and use of an ion-exchange resin. On the other hand, as a method to add a halogen ion to an ink to allow the content to be 1.0 μg/g of the ink-100 μg/g of the ink, cited is a method to add, directly or via previous dissolution in water or an organic solvent, an inorganic salt such as sodium chloride, potassium chloride, sodium bromide, or potassium bromide, or a quaternary ammonium salt such as tetramethylammonium chloride or tetramethylammonium bromide.

Determination of the halogen ion content in an ink is carried out as follows: an ink is stirred with pure water and halogen ions are extracted into the water phase, followed by elimination of the solids via filtration to perform quantitative analysis via ion chromatography. In a specific determination method, 1.0 g of an ink is precisely weighed and 30 ml of ultrapure water is added for stirring for 30 minutes, followed by standing for 1 hour and filtration, and then the resulting liquid after filtered is quantitatively analyzed via an ion chromatographic analysis method to determine the extracted halogen ion amount per g of the ink (μg/g of the ink).

<<Colorants>>

When the ink-jet ink of the present invention is colored, a pigment is preferably used as a colorant. As the pigment, carbon black, colorless inorganic pigments such as titanium oxide or calcium carbonate, or colored organic pigments are usable. The organic pigments include insoluble azo pigments such as Toluidino Red, Toluidino Maroon, Hanza Yellow, Benzidine Yellow, or Pyrazolone Red; soluble azo pigments such as Lithol Red, Helio Bordeaux, Pigment Scarlet, or Permanent Red 2B; derivatives from vat dyes such as alizarin, indanthrone, or Thioindigo Maroon; phthalocyanine-based organic pigments such as Phthalocyanine Blue or Phthalocyanine Green; quinacridone-based organic pigments such as Quinacridone Red or Quinacridone Magenta; perylene-based organic pigments such as Perylene Red or Perylene Scarlet; isoindolinone-based organic pigments such as Isoindolinone Yellow or Isoindolinone Orange; pyranthrone-based organic pigments such as Pyranthrone Red or Pyranthrone Orange; thioindigo-based organic pigments; condensed azo-based organic pigments; benzimidazolone-based organic pigments; quinophtharone-based organic pigments such as Quinophthalone Yellow; isoindoline-based organic pigments such as Isoindoline Yellow; and as other pigments, Flavanthrone Yellow, Acylamide Yellow, Nickel Azo Yellow; Copper Azomethine Yellow, Perynone Orange, Anthrone Orange, Dianthraquinonyl Red, and Dioxazine Violet.

Such organic pigments are exemplified with Color Index (C.I.) numbers as follows:

C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185;

C.I. Pigment Orange 16, 36, 43, 51, 55, 59, and 61;

C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240;

C.I. Pigment Violet 19, 23, 29, 30, 37, 40, and 50;

C.I. Pigment Blue 15, 15:1, 15:3, 15:4, 15:6, 22, 60, and 64;

C.I. Pigment Green 7 and 36; and

C.I. Pigment Brown 23, 25, and 26.

Of the above pigments, due to excellent light stability, preferable are quinacridone-based organic pigments, phthalocyanine-based organic pigments, benzimidazolone-based organic pigments, isoindolinone-based organic pigments, condensed azo based organic pigments, quinophtharone-based organic pigments, and isoindoline-based organic pigments.

An organic pigment is preferably in the form of fine particles, having an average particle diameter of 10-150 nm in an ink as a determined value via laser scattering. When the average particle diameter of the pigment is less than 10 nm light stability decreases due to the decreased particle diameter. In the case of more than 150 nm, it becomes difficult to maintain dispersion stability and then the pigment tends to precipitate and also ejection stability decreases, resulting in the problem of occurrence of fine mists referred to as satellites. However, in the case of titanium oxide, to provide whiteness and opacifying properties, average particle diameter is allowed to be 150-300 nm, preferably 180-250 nm.

Further; coarse particles are preferably eliminated via adequate dispersion or filtration so as for the maximum particle diameter of a pigment in an ink not to exceed 1.0 µm. The presence of such coarse particles also degrades ejection stability.

To allow an organic pigment to be fine, the following method is performed: namely, a mixture containing at least 3 components of an organic pigment, a water-soluble inorganic salt of at least 3 factors by mass of the amount of the organic pigment, and a water-soluble solvent is formed into clay, which then is strongly kneaded to form fine sizes, followed by being placed into water to give a slurry form by stirring using a high speed mixer, and then the slurry is repeatedly filtered and washed to eliminate the water-soluble inorganic salt and the water-soluble solvent via aqueous treatment. In such a process to prepare fine-sized particles, any appropriate resin and pigment disperser may be added.

As the water-soluble inorganic salt, sodium chloride and potassium chloride are listed. Any of these inorganic salts are used in the range of 3-20 factors by mass of the amount of an organic pigment. After dispersion treatment, to realize the halogen ion content specified in the present invention, chlorine ions (halogen ions) are eliminated via washing treatment. When the amount of the inorganic salt is less than 3 factors by mass, a treated pigment is unable to be obtained at a desired size. In contrast, in the case of more than 20 factors by mass, enormous washing treatment in the post process is required, resulting in a substantially small treatment amount of the organic pigment.

A water-soluble solvent makes it possible to produce an appropriate clay state of an organic pigment and a water-soluble inorganic salt used as a pulverizing aid which is employed to efficiently carry out adequate pulverization. The solvent is not specifically limited if being a water-soluble solvent. However, since temperature elevation during kneading allows the solvent to easily evaporate, a solvent of a boiling point of 120-250° C. is preferable torn the viewpoint of safety. Such a water-soluble solvent includes 2-(methoxymethoxy)ethanol, 2-butoxyethanol, 2-(i-pentyloxy)ethanol, 2-(hexyloxy)ethanol, diethylene glycol, diethylene glycol monomethyl ether, diethyl ene glycol monoethyl ether, diethylene glycol monobutyl ether, tiethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

Further, to accelerate adsorption of a pigment disperser to the surface, a pigment is preferably surface-treated via a well technology using acidic treatment, basic treatment, a synergist, or various types of coupling agents, torn the viewpoint of ensuring dispersion stability.

To realize adequate density and light stability, the pigment is preferably contained at 1.5-8% by mass in the case of a color except white in an ink-jet ink and at 1-30% by mass in a white ink employing titanium oxide.

<<Pigment Dispersers>>

As pigment dispersers, listed are a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a copolymer, a modified polyurethane, a modified polyacrylate, a polyether ester-type anionic surfactant, a naphthalenesulfonic acid formalin condensate salt; an aromatic sulfonic acid formalin condensate salt, a polyoxyethylene alkyl phosphoric acid ester, a polyoxyethylene nonylphenyl ether, stearyl amine acetate, and a pigment derivative.

Specific examples of the dispersers include "Anti-Terra-U (a polyaminoamide phosphoric acid salt)," "Anti-Terra-2031204 (a high molecular weight polycarboxylic acid salt)," "Disperbyk-101 (a polyaminoamide phosphoric acid salt and an acid ester), 107 (a hydroxyl group-containing carboxylic acid ester), 110 (an acid group-containing copolymer), 130 (a polyamide), 161, 162, 163, 164, 165, 166, and 170 (a copolymer)," "400," "Bykumen (a high molecular weight unsaturated acid ester)," "BYK-P104, P105 (a high molecular weight unsaturated acid polycarboxylic acid)," "P104S, 240S (a high molecular weight unsaturated acid polycarboxylic acid and a silicon-base)," and "Lactation (a long-chain amine, an unsaturated acid polycarboxylic acid, and silicon)" (produced by BYK Chemie GmbH).

Further, listed are "Efka 44, 46, 47, 48, 49, 54, 63, 64, 65, 66, 71, 701, 764, and 766" and "Efka Polymer 100 (a modified polyacrylate), 150 (an aliphatic modified polymer), 400, 401, 402, 403, 450, 451, 452, 453 (a modified polyacrylate), and 745 (a copper phthalocyanine-base)" (produced by Efka Chemicals Co.); "Flowlen TG-710 (a urethane oligomer)," "Flownon SH-290 and SP-1000," and "Polyflow No. 50E and No. 300 (an acrylic copolymer)" (produced by Kyoeisha Chemicals Co., Ltd.); and "Disparlon KS-860, 873SN, and 874 (a polymer disperser), #2150 (an aliphatic polycarboxylic acid), and #7004 (a polyether ester-type)" (produced by Kusumoto Chemicals, Ltd.).

Still further, listed are "Demol RN, N (a naphthalenesulfonic acid formalin condensate sodium salt), MS, C, SN-B (an aromatic sulfonic acid formalin condensate sodium salt), and EP," "Homogenol L-18 (a polycarboxylic acid-type polymer)," "Emulgen 920, 930, 931, 935, 950, and 985 (a polyoxyethylene nonyl phenyl ether)," and "Acetamin 24 (a coconut amine acetate) and 86 (a stearylamine acetate)" (produced by Kao Corp.); "Solsperse5000 (a phthalocyanine ammonium salt-base), 13240, 13940 (a polyester amine-base), 17000 (a fatty acid amine-base), 21000, 32000, and 7000" (produced by Zeneca Co.); "Nikkol T106 (a polyoxyethylene sorbitan monooleate)," "MYS-IEX (a polyoxyethylene monostearate)," and "Hexagline 4-0 (a hexaglyceryl tetraoleate)" (produced by Nikko Chemicals Co., Ltd.); and "AJISPER 821, 822, and 824" (produced by Ajinomoto Fine-Techno Co., Inc).

These pigment dispersers are preferably contained at 5-70% by mass based on 100% by mass of a pigment, more preferably 10-50% by mass. In the case of less than 5%, no dispersion stability is realized. In contrast, in the case of more than 70% by mass, ejection stability is degraded.

Further, these pigment dispersers preferably exhibit a solubility of at least 5% by mass at 0° C. with respect to the entire cationically polymerizable compound. In cases where the solubility is less than 5% by mass, when an ink is stored at a low temperature between about 0° C. and 10° C., unfavorable polymer gel or an unfavorable soft aggregate of a pigment is generated, resulting in degraded ink storage stability and ejection stability.

<<Radical Polymerization Hthibitors>>

In the ink of the present invention, a radical polymerization inhibitor is preferably added from the viewpoint of storage stability. It is conceivable that an ink mainly containing the vinyl ether of the present invention is occasionally subjected to radical polymerization via radicals generated due to the effect of heat or light during storage. Use of a radical polymerization inhibitor for the ink of the present invention is an extremely preferable embodiment, since an effect to prevent radical polymerization occurring during storage is produced and in contrast, curing via photo-cationic polymerization is not inhibited, whereby photo-curing of an ink mainly containing a vinyl ether as described in the present invention and exhibiting extremely excellent curability is not inhibited, resulting in action to enhance only ink storage stability over time.

As the radical polymerization inhibitor, listed are a phenol-based hydroxyl group-containing compound, methoquinone (hydroquinone monomethyl ether), hydroquinone, 4-methoxy-1-naphthol, a hindered amine-based anti-oxidant, 1,1-diphenyl-2-picrylhidrazyl free radical, an N-oxide compound, a piperidine 1-oxyl free radical compound, a pyrrolidine 1-oxyl free radical compound, an N-nitrosophenyl hydroxylamine, a nitrogen-containing heterocyclic mercapto-based compound, a thio ether-based anti-oxidant, a hindered phenol-based anti-oxidant, an ascorbic acid, zinc sulfate, a thiocyanic acid salt, a thiourea derivative, various sugars, a phosphoric acid-based anti-oxidant, a nitrous acid salt, a sulfurous acid salt, a thiosulfuric acid salt, a hydroxylamine derivative, a polycondensate of a dicyandiamide and a polyalkylenepolyamine, and phenothiazine.

As the radical polymerization inhibitor, specifically, the following compounds can be listed.

Phenol-based compounds are, for example, as follows: phenol, an alkyl phenol such as o-, m-, or p-cresol (methylphenol), 2-t-butyl-4-methylphenol, 6-t-butyl-2,4-dimethylphenol, 2,6-di-t-butyl-4-methylphenol, 2-t-butylphenol, 4-t-butylphenol, 2,4,-di-t-butylphenol, 2-methyl-4-t-butylphenol, 4-t-butyl-2,6-dimethylphenol, or 2,2'-methylene-bis-(6-t-butyl-methylphenol), 4,4'-oxydiphenyl, 3,4-methylenedioxydiphenol (sesame oil), 3,4-dimethylphenol, benzcatechin (1,2-dihydroxybenzene), 2-(1'-methylcyclohex-1'-yl)-4,6-dimethylphenol, 2- or 4-(1'-phenyleth-1'-yl) phenol, 2-t-butyl-6-methylphenol, 2,4,6-tris-t-butylphenol, 2,6-di-t-butylphenol, nonylphenol [CAS No. 11066-49-2], octylphenol [CAS No. 140-66-9], 2,6-dimethylphenol, bisphenol A, bisphenol B, bisphenol C, bisphenol. F, bisphenol S, 3,3",5,5'-tetrabromobisphenol A, 2,6-di-t-butyl-p-cresol, Koresin (produced by BASF Aktiengesellschaff), methyl 3,5-di-t-butyl-4-hydroxybenzoate, 4-t-butylbeozocatechin, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyl-β-(3,5-di-t-butyl-4-hydroxyphenyl)propionate, 1,1,3-tris-(2-methyl-4-hydroxyl-5-t-butylphenyl)butane, 1,3,5-trimethyl-2,4,6-tris-(3,5-di-t-butyl-4-hydroxybenzyl)benzene, 1,3,5-tris-(3,5-di-t-butyl-4-hydroxybenzyl)isocyanurate, 1,3,5-tris-(3,5-di-t-butyl-4-hydroxyphenyl)propionyloxyethyl-isocyanurate, 1,3,5-tris-(2,6-dimethyl-3-hydroxy-4-t-butylbenzyl)isocyanurate, pentaerythrit-tetrakis-[β-(3,5-di-t-butyl-4-hydroxphenyl) propionate], 2,6-di-t-butyl-4-dimethylaminomethylphenol, 6-s-butyl-2,4-dinitrophenol, Irganox 565, 1010, 1076, 1141, 1192, 1222, and 1425 (produced by Firma Ciba Spezialitaetenchemie), octadecyl 3-(3',5'-di-t-butyl-4'-hydroxyphenyl) propionate, hexadecyl 3-(3',5'-di-t-butyl-4'-hydroxyphenyl) propionate, octyl 3-(3',5'-di-t-butyl-4'-hydroxyphenyl) propionate, 3-thia-1,5-pentanediol-bis-[(3',5'-di-t-butyl-4'-hydroxyphenyl)propionate], 4,8-dioxa-1,11-undecanediol-bis[(3',5'-di-t-butyl-4'-hydroxyphenyl)propionate], 4,8-dioxa-1,11-undecanediol-bis-[(3'-t-butyl-4'-hydroxy-5'-methylphenyl)propionate], 1,9-nonanediol-bis[(3',5'-di-t-butyl-4'-hydroxyphenyl)propionate], 1,7-heptanediamine-bis[3-(3',5'-di-t-butyl-4'-hydroxyphenyl)propionamide], 1,1-methanediamine-bis[3-(3',5'-di-t-butyl-4'-hydroxyphenyl) propionamide], 3-(3',5'-di-t-butyl-4'-hydroxyphenyl) propionic acid hydrazide, 3-(3',5'-dimethyl-4'-hydroxyphenyl)propionic acid hydrazide, bis-(3-t-butyl-5-ethyl-2-hydroxyphen-1-yl)methane, bis-(3,5-di-t-butyl-4-hydroxyphen-1-yl)methane, bis-[3- (1'-methylcyctohex-1'-yl)-5-methyl-2-hydroxyphen-1-yl]methane, bis-(3-t-butyl-2-hydroxy-5-methylphen-1-yl)methane, 1,1-bis-(5-t-butyl-4-hydroxy-2-methylphen-1-yl)ethane, bis-(5-t-butyl-4-hydroxy-2-methylphen-1-yl)sulfide, bis-(3-t-butyl-2-hydroxy-5-methylphen-1-yl)sulfide, 1,1-bis-(3,4-dimethyl-2-hydroxyphen-1-yl)-2-methylpropane, 1,1-bis-(5-t-butyl-3-methyl-2-hydroxyphen-1-yl)butane, 1,3,5-tris-[1'-(3",5"-di-t-butyl-4"-hydroxyphen-1"'-yl)meth-1'-yl]-2,4,6-trimethylbenzene, 1,1,4-tris-(5'-t-butyl-4'-hydroxy-2'-methylphen-1'-yl)butane, t-butylcatechol, an aminophenol such as p-aminophenol, a nitrosophenol such as p-nitrosophenol or p-nitroso-o-cresol, an alkoxyphenol such as 2-methoxyphenol (guaiacol, benzcatechin monomethyl ether), 2-ethoxyphenol, 2-isopropoxyphenol, 4-methoxyphenol (hydroquinone monomethyl ether), or mono- or di-t-butyl-4-methoxyphenol, 3,5-di-t-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3- -methoxyphenyl)ethanone (acetovanillone), eugenol, dihydroeugenol, isoeugenol, a tocopherol such as α-, β-, γ-, δ- and ε-tocopherol, tocol, α-tocopherolhydroquinone, and 2,3-dihydro-2,2-dimethyl-7-hydroxybenzofuran (2,2-dimethyl-7-hydroxycoumarane).

Further, quinones and hydroquinones include, for example, hydroquinone, hydroquinone monomethyl ether (4-methoxyphenol), methylhydroquinone, 2,5-di-t-butylhydroquinone, 2-methyl-p-hydroquinone, 2,3-dimethylhydroquinone, trimethylhydroquinone, 4-methylbezcatechin, t-butylhydroquinone, 3-methylbenzcatechin, benzoquinone, 2-methyl-p-hydroquinone, 2,3-dimethylhydroquinone, trimethylhydroquinone, t-butylhydroquinone, 4-ethoxyphenol, 4-butoxyphenol, hydroquinone monobenzyl ether, p-phenoxyphenol, 2-methylhydroquinone, tetramethyl-p-benzoquinone, diethyl-1,4-cyclohexanedione-2,5-dicarboxylate, phenyl-p-benzoquinone, 2,5-dimethyl-3-benzyl-p-benzoquinone, 2-isopropyl-5-methyl-p-benzoquinone (thymoquinone), 2,6-diisopropyl-p-benzoquinone, 2,5-dimethyl-3-hydroxy-p-benzoquinone, 2,5-dihydroxy-p-benzoquinone, embelin, tetrahydroxy-p-benzoquinone, 2,5-dimethoxy-1,4- benzoquinone, 2-amino-5-methyl-p-benzoquinone, 2,5-bisphenylamino-1,4-benzoquinone, 5,8-dihydroxy-1,4-naphthoquinone, 2-anilino-1,4-naphthoquinone, anthraquinone, N,N-dimethylindoaniline, N,N-diphenyl-p-benzoquinonediimine, 1,4-benzoquinonedioxime, ceruli-gnone, 3,3'-di-t-butyl-5,5'-dimethyldiphenoquinone, p-rosolic acid (aurin), 2,6-di-t-butyl-4-benzylidenebenzoquinone, and 2,5-di-t-butyl-amylhydroquinone.

Still further, as N-oxyls (compounds containing a nitroxyl- or N-oxyl group, or at least one >N—O— group), preferable are, for example, 4-hydroxy-2,2,6,6-tetramethyl-piperidine-N-oxyl, 4-oxo-2,2,6,6-tetramethyl-piperidine-N-oxyl, 4-methoxy-2,2,6,6-tetramethyl-piperidine-N-oxyl, 4-acetoxy-2,2,6,6-tetramethyl-piperidine-N-oxyl, 2,2,6,6-tetramethyl-piperidine-N-oxyl, Uvinul 4040P (produced by BASF Aktiengesellschaft), 4,4',4"-tris-(2,2,6,6-tetramethyl-piperidine-N-oxyl)phosphite, 3-oxo-2,2,5,5-tetramethyl-pyrrolidine-N-oxyl, 1-oxyl-2,2,6,6-tetramethyl-4-methoxypiperidine, 1-oxyl-2,2,6,6-tetramethyl-4-trimethylsilyloxypiperidine, 1-oxyl-2,2,6,6-tetramethylpiperidin-4-yl-2-ethylhexanoate, 1-oxyl-2,2,6,6-tetramethylpiperidin-4-yl-sebacate, 1-oxyl-2,2,6,6-tetramethylpiperidin-4-yl-stearate, 1-oxyl-2,2,6,6-tetramethylpiperidin-4-yl-benzoate, 1-oxyl-2,2,6,6-tetramethylpiperidin-4-yl-(4-t-butyl)benzoate, bis-(1-oxyl-2,2,6,6-tetramethylpiperidin-4-yl)succinate, bis-(1-oxyl-2,2,6,6-tetramethylpiperidin-4-yl)adipate, bis-(1-oxyl-2,2,6,6-tetramethylpiperidin-4-yl) 1,10-decanedioate, bis-(1-oxyl-2,2,6,6-tetramethylpiperidin-4-yl)n-butylmalonate, bis-(1-oxyl-2,2,6,6-tetramethylpiperidin-4-yl)phthalate, bis-(1-oxyl-2,2,6,6-tetramethylpiperidin-4-yl)isophthalate, bis-(1-oxyl-2,2,6,6-tetramethylpiperidin-4-yl)terephthalate, bis-(1-oxyl-2,2,6,6-tetramethylpiperidin-4-yl) hexahydroterephthalate, N,N'-bis-(1-oxyl-2,2,6,6-tetramethylpiperidin-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl] triazine, N,N'-bis-(1-oxyl-2,2,6,6-tetramethylpiperidin-4-yl)-N,N'-bis-formyl-1,6-diaminohexane, and 4,4'-ethylene-bis-(1-oxyl-2,2,6,6-tetramethylpiperazin-3-one).

As aromatic amines or phenylenediamines, preferable are, for example, N,N-diphenylamine, N-nitroso-diphenylamine, nitrosodiethylaniline, p-phenylenediamine, an N,N'-dialkyl-p-phenylenediamine (herein the alkyl groups may be the same or differ and each may be independent, being straight-chained or branched having 1-4 carbon atoms) such as N,N'-di-isobutyl-p-phenylenediamine, or N,N'-di-isopropyl-p-phenylenediamine, Irganox 5057 (produced by Firma Ciba Spezialitaetenchemie), N-phenyl-p-phenylenediamine, N,N'-diphenyl-p-phenylenediamine, N-isopropyl-N-phenyl-p-phenylenediamine, N,N'-di-s-butyl-p-phenylenediamine (Kerobit BPD produced by BASF Aktiengesellschaft), N-phenyl-N'-isopropyl-p-phenylenediamine (Vulkanox 4010 produced by Bayer AG), N-(1,3-dimethylbutyl)-N'-phenyl-p-phenylenediamine, N-phenyl-2-naphthylamine, iminodibenzyl, N,N''-diphenylbenzidine, N-phenyltetraaniline, acridone, 3-bydroxydiphenylamine, and 4-hydroxydiphenylamine.

Imines include, for example, methylethylimine, (2-hydroxyphenyl)benzoquinonimine, (2-hydroxyphenyl)benzophenonimine, N,N-dimethylindoaniline, thionine(7-amino-3-imino-3H-phenothiazine), and Methylene Violet (7-dimethylamino-3-phenothiazinone).

Sulfonamides effective as a radical polymerization inhibitor include, for example, N-methyl-4-toluenesulfonamide, N-t-butyl-4-toluenesulfonamide, N-t-butyl-N-oxyl-4-toluenesulfonamide, bis(4-sulfanilamide)piperidine, and 3-{[5-(4-aminobenzoyl)-2,4-dimethylbenzenesulfonyl]ethylamino}-4-methylbenzenesulfonic acid.

Oximes effective as a radical polymerization inhibitor include, for example, aldoximes, ketoximes, or amidoximes, preferably diethyl ketoxime, acetoxime, methyl ethyl ketoxime, cylcohexanone oxime, benzaldehyde oxime, benzyl dioxime, dimethylglyoxime, 2-pyridinaldoxime, salicylaldoxime, phenyl-2-pyridyl ketoxime, 1,4-benzoquinone dioxime, 2,3-butanedione dioxime, 2,3-butanedione monooxime, 9-fluorenone oxime, 4-t-butyl-cyclohexanone oxime, ethyl N-ethoxy-acetimidate, 2,4-dimethyl-3-pentanone oxime, cyclododecanone oxime, 4-heptanone oxime, and di-2-furanylethanedione dioxime, or other aliphatic or aromatic oximes or alkyl transfer reagents such as alkyl halides, triflates, sultanates, tosylates, carbonates, sulfates, or phosphates, as well as reaction products thereof.

Hydroxylamines include, for example, N,N-diethylhydroxylamine and the compounds described in the International Application Publication of PCT/EP 03/03139.

As urea derivatives, for example, urea or thiourea is suitable.

Phosphor-containing compounds include, for example, triphenylphosphine, triphenyl phosphite, hypophosphorous acid, trinonyl phosphite, triethyl phosphite, and diphenylisopropylphosphine.

As sulfur-containing compounds, suitable are, for example, diphenyl sulfide, phenothiazine, and sulfur-containing natural substances such as cysteine.

Complexing agents based on tetraazaannulene (TAA) include, for example, dibenzotetraaza[14] rings and porphyrins as listed in Chem. Soc. Rev., 1998, 27, 105-115.

In addition, listed are metal (copper, manganese, cerium, nickel, and chromium) salts such as carbonates, chlorides, dithiocarbamates, sulfates, salicylates, acetates, stearates, and ethylhexanoates.

Further, an N-oxyl free radical compound having a vinyl ether functional group, as described in Macromol. Rapid Commun., 28, 1929 (2007), is structured so as to have both a cationically polymerizable function and a radical trapping function in the same molecule and therefore preferably added to the ink of the present invention from the viewpoint of curability and ink storage stability. Still further, a polymer obtained via cationic polymerization of such an N-oxyl free radical compound having a vinyl ether functional group is a polymer having a structure with free radicals in its side chains and therefore preferably added to the ink of the present invention in view of cured film physical properties such as solvent resistance, anti-abrasion properties, or weather resistance, or ink storage stability.

The added amount of a radical polymerization inhibitor is preferably 1.0-5000 μg/g of the ink, more preferably 10-2000 μg/g of the ink. In the case of at least 1.0 μg/g of the ink, desired storage stability is realized, and then increased viscosity of the ink and liquid repellency to the ink-jet nozzles can be realized, which is preferable from the viewpoint of ejection stability. Further, in the case of at most 5000 μg/g of the ink, the acid generating efficiency of a polymerization initiator is not impaired, resulting in maintaining high curing sensitivity.

<<Cationic Polymerization Inhibitors>>

In the ink of the present invention, a cationic polymerization inhibitor can also be added. As such a cationic polymerization inhibitor, alkali metal compounds and/or alkaline earth metal compounds or amines can be listed.

As the amines preferably listed are alkanolamines, N,N'-dimethylalkylamines, N,N'-dimethylalkenylamines, N,N'- dimethylalkynylamines including specifically triethanolamine, triisopropanolamine, tributanolamine, N-ethyldiethanolamine, propanolamine, n-butylamine, sec-butylamine, 2-aminoethanol, 2-methylaminoethanol, 3-methylamino-1-propanol, 3-methylamino-1,2-propanediol, 2-ethhylaminoethanol, 4-ethylamino-1-butanol, 4-(n-butylamino)-1-butanol, 2-(t-butylamino)ethanol, N,N-dimethylundecanol, N,N-dimethyldodecanolamine, N,N-dimethyltridecanolamine, N,N-dimethyltetradecanolamine, N,N-dimethylpentadecanolamine, N,N-nonadecylamine, N,N-dimethylicosylamine, N,N-dimethyleicosylamine, N,N-dimethylhenicosylamine, N,N-dimethyldocosylamine, N,N-dimethyltricosylamine, N,N-dimethyltetracosylamine, N,N-dimethylpentacosylamine, N,N-dimethylpentanolamine, N,N-dimethylhexylamine, N,N-dimethylheptanolamine, N,N-dimethylocranolamine, NSF-dimdhylnonanolamine, N,N-dimethyldecanolamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, or N,N-dimethyloctadecylamine. Other than these, quaternary ammonium salts can also be used.

The added amount of a cationic polymerization inhibitor is preferably 50-5000 μg/g of the ink. In the case of at least 50 μg/g of the ink, desired storage stability is realized, and then increased viscosity of the ink and liquid repellency to the ink-jet nozzles can be realized, which is preferable from the viewpoint of ejection stability. Further, in the case of at most 5000 μg/g of the ink, the acid generating efficiency of a polymerization initiator is not impaired, resulting in maintaining high caring sensitivity.

<<Photo-cationic Polymerization Initiators>>

As a photo-cationic polymerization initiator usable for the ink of the present invention, well-known photolytically acid generating agent can be used.

As such a photolytically acid generating agent, any compound used, for example, for chemical sensitization-type photoresists and photo-cationic polymerization is used (refer to pages 187-192 of "Imaging Yo Yuki Zairyo (Organic Materials Used for Imaging Applications)" edited by Yuki Electronics Zairyo Kenkyukai published by Bunshin Shuppan (1993). Examples of compounds suitable for the present invention will now be listed.

Initially, there can be listed $B(C_6F_5)^{4-}$, $PF_6^-$, $AsF_6^-$, $SbF_6^-$, and $CF_3SO_3^-$ salts of aromatic onium compounds such as diazonium, ammonium, iodonium, sulfonium, and phosphonium.

Specific examples of such onium compounds usable for the present invention are listed below.

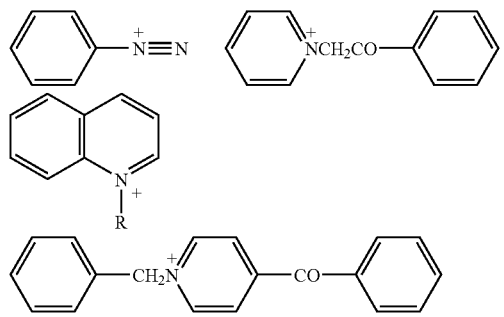

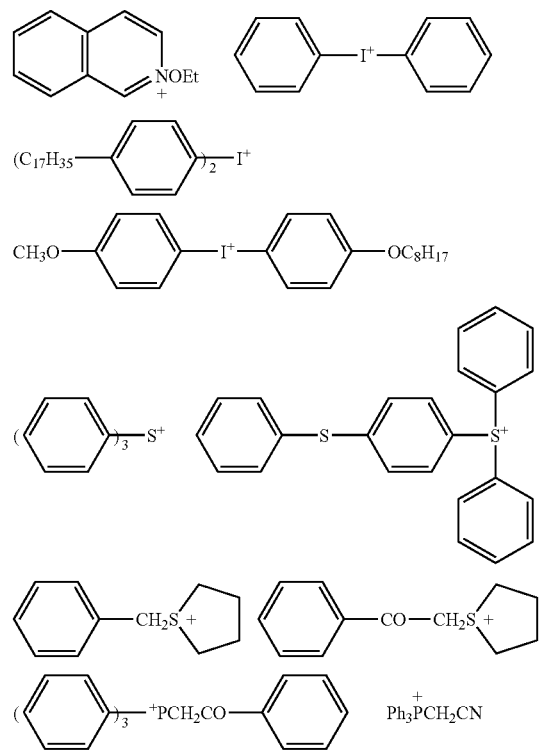

Secondly, sulfonated compounds generating sulfonic acid can be listed and specific compounds will now be exemplified.

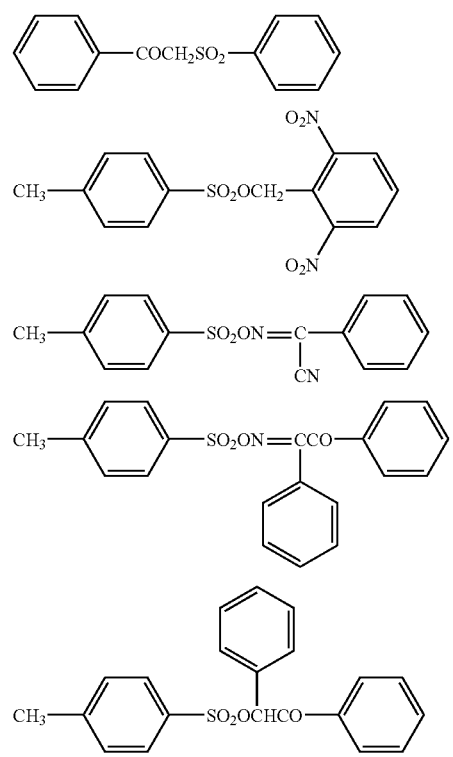

-continued

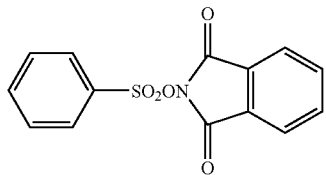

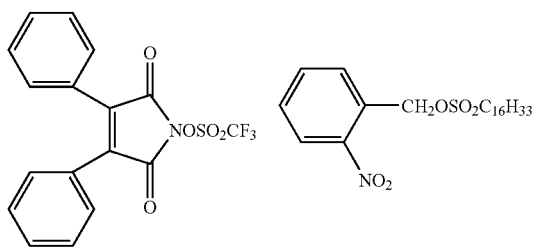

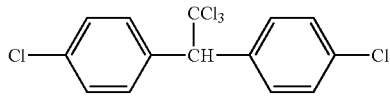

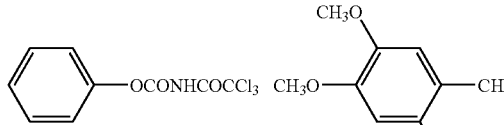

Thirdly, halides photolytically generating hydrogen halides are usable. Specific compounds will now be exemplified.

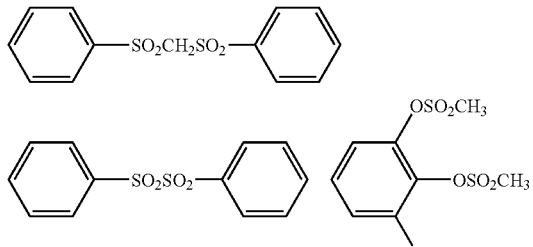

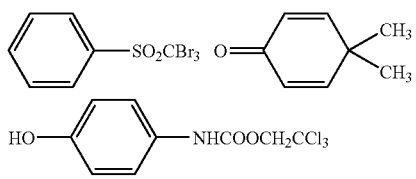

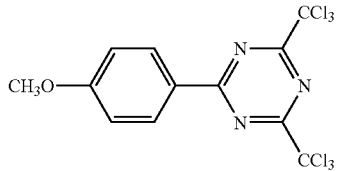

Fourthly, iron-arene complexes can be listed.

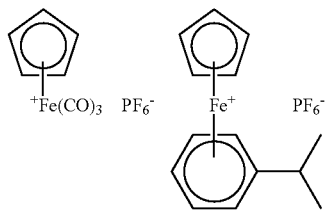

Further, in the ink of the present invention, preferable are sulfonium salt compounds represented by following Formulas [1]-[4] which generate no benzene via actinic energy radiation irradiation, and those having a substituent in a benzene ring joining an $S^+$ satisfy the above condition.

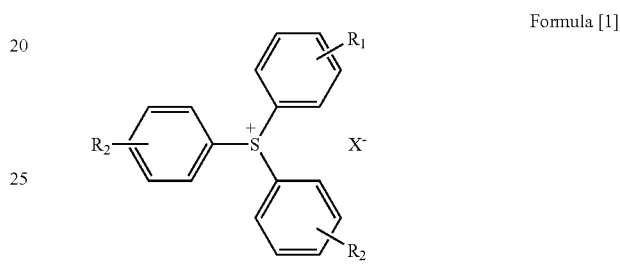

Formula [1]

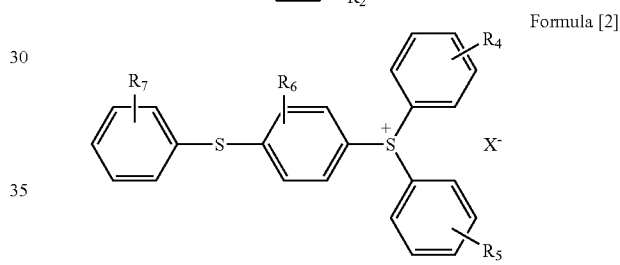

Formula [2]

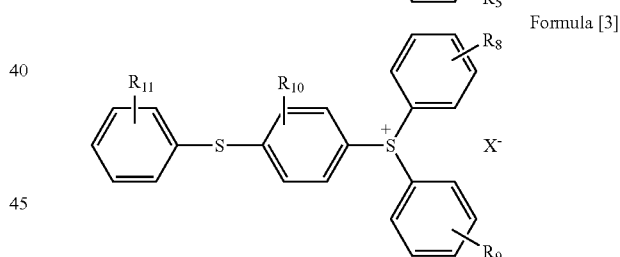

Formula [3]

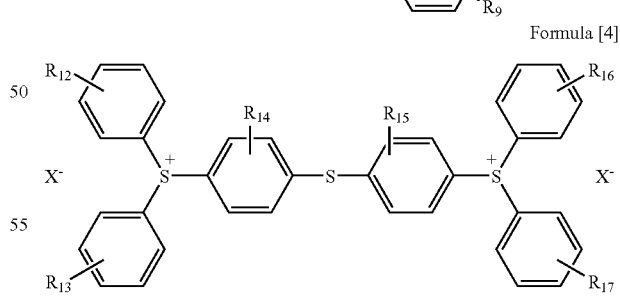

Formula [4]

In above Formulas [1]-[4], $R_1$-$R_{17}$ each represent a hydrogen atom, or a substituent. $R_1$-$R_3$, $R_4$-$R_7$, $R_8$-$R_{11}$, and $R_{12}$-$R_{17}$ do not represent a hydrogen atom simultaneously, respectively.

Preferable substituents represented by $R_1$-$R_{17}$ include an alkyl group such as a methyl group, an ethyl group, a propyl group, an isopropyl group, a butyl group, an isobutyl group, a t-butyl group, a pentyl group, or a hexyl group; an alkoxy group such as a methoxy group, an ethoxy group, a propoxy group, a butoxy group, a hexyloxy group, a decyloxy group, or a dodecyloxy group; a carbonyl group such as an acetoxy group, a propionyloxy group, a decylcarbonyloxy group, a dodecylcarbonyloxy group, a methoxycarbonyl group, an ethoxycarbonyl group, or a benzoyloxy group; a phenylthio group; a halogen atom such as a fluorine atom, a chlorine atom, a bromine atom, or an iodine atom; a cyano group; a nitro group; and a hydroxy group.

X represents a non-nucleophilic anion residue. Listed are, for example, a halogen atom such as F, Cl, Br, or I, $B(C_6F_5)_4$, $R_{18}COO$, $R_{19}SO_3$, $SbF_6$, $AsF_6$, $PF_6$, and $BF_4$. However, $R_{18}$ and $R_{19}$ each represent an alkyl group or a phenyl group which may be substituted with an alkyl group such as a methyl group, an ethyl group, a propyl group, or a butyl group, a halogen atom such as fluorine, chlorine, bromine, or iodine, a nitro group, a cyano group, or an alkoxy group such as a methoxy group or an ethoxy group. Of these, $B(C_6F_5)_4$ and $PF_6$ are preferable from the viewpoint of safety.

The above compounds can readily be synthesized by methods known in the art in the same manner as for photolytically acid generating agents described in Bulletin of The Chemical Society of Japan, Vol. 71, No. 11, 1998, and "Imaging Yo Yuki Zairyo (Organic Materials Used for Imaging Applications)" edited by Yuki Electronics Zairyo Kenkyukai published by Bunshin Shuppan (1993).

In addition, listed are the fluorinated alkyl fluorophosphoric acid onium salts described in WO 2005/116038, the dithienylbenzene sulfonium salts described in JP-A Nos. 2008-273878 and 2008-273879, and the bithiophene disulfonium salts described in JP-A No. 2008-239519. The sulfonium salts described in Japanese Translation of PCT International Application Publication No. 2005-501040 are preferable due to minimal odor.

Further, usable are compounds in which any of these photo-cationic polymerization initiators or a group or compound having the same function is introduced into the main chain or side chains of a polymer. There can be used the compounds described, for example, in U.S. Pat. No. 3,849,137, German Patent No. 3914407, and JP-A Nos. 63-26653, 55-164824, 62-69263, 63-146038, 63-163452, 62-153853, and 63-1.46029. Still further, usable are the photolytically acid generating compounds described in U.S. Pat. No. 3,779,778 and EP No. 126,712.

Specifically listed are acid generating agents such as aryl sulfonium salt derivatives (Silacure UVI-6990 and Silacure UVI-6974 produced by Union Carbide Corp.; Adekaoptomer SP-150, Adekaoptomer SP-152, Adekaoptomer SP-170, and Adekaoptomer SP-172 produced by Asahi Denka, Kogyo K.K.; CPI-100P, CPI-110P, and CPI-110A produced by San Apro Ltd.; TS-91 produced by Sanwa Chemical Co., Ltd.; and Esacure1187 and Esacure1188 produced by Lamberti Co.); allyl iodonium salt derivatives (RP-2074 produced by Rodia Co. and Irgacure 250 produced by Ciba Geigy Co.); Arene-ion complex derivatives (Irgacure 250 produced by Ciba Geigy Co.); diazonium salt derivatives; triazine-based initiators; or other halides.

Such a photo-cationic polymerization initiator is preferably contained at 0.2-10 parts by mass based on 100 parts by mass of a cationically polymerizable compound, more preferably 0.5-5 parts by mass. When the content of the photo polymerization initiator is less than 0.2 parts by mass, a cured material is difficult to obtain. Even when the content is more than 10 parts by mass, the initiator itself serves as a UV absorbent, resulting in a shielding effect in the ink, whereby no effect to further enhance curability is produced and also ink storage stability at low and high temperatures is degraded.

These photo-cationic polymerization initiators can be used individually or in combinations of at least 2 types.

<<Thermal Stability of Photolytically Acid Generating Agents>>

With regard to a photolytically acid generation agent, components assumed to be its main component and impurities occasionally decompose very slightly during long-term ink storage. During this process, radicals and protic acids are generated and polymerizable compounds having a vinyl ether group in the ink are incorrectly polymerized in some cases.

Therefore, the thermally acid generating amount of a photolytically acid generating agent applied to the present invention is preferably at most $1 \times 10^{-4}$ mmol/L from the viewpoint of ink storage stability over time. The thermally acid generating amount referred to in the present invention is the difference in hydrogen ion concentration (mol/L) in solutions before and after refluxing treatment when a dioxane solution of 0.02 mol/L of a photolytically acid generating agent is refluxed for 20 hours.

When such a photolytically acid generating agent having the above characteristics is applied, formation of both radicals and protic acids during long-term ink storage is inhibited, which is preferable for ink storage stability. Especially, an ink employing a polymerizable compound having a vinyl ether group is easily affected by radicals generated during ink storage. Therefore, in the ink of the present invention, the thermally acid generating amount of a photolytically acid generating agent is very preferably reduced to lower the radical generating amount.

The thermally acid generating amount of a photolytically acid generating agent is specifically determined based on the following method.

(1) A dioxane solution of 0.02 mol/L of a photolytically acid generating agent is refluxed for 20 hours.

(2) With regard to solutions before and after reflux treatment, 1 g of each solution and 4 g of pure water are mixed and then the pH of the water layer being a supernatant solution is determined.

(3) [$H^+$] concentrations before and after reflux treatment are calculated based on the pH determination results and then the difference of [$H^+$] concentration before reflux treatment—[$H^+$] concentration after reflux treatment is designated as the thermally acid generating amount.

To realize such a thermally acid generating amount, an aryl sulfonium salt derivative is preferable as a compound for a photolytically acid generating agent. Further, higher purity is preferable. The purity is preferably at least 80%, more preferably at least 90%.

Other than a photolytically acid generating agent itself, impurities incorporated during synthesis occasionally increase thermally acid generating amount. As methods to reduce impurities, known are a method of adsorption to activated carbon or a basic adsorbent and a separation method such as column chromatography, crystallization, or recrystallization. Even in cases in which impurities are reduced via any of these processes, when thermal stability is inadequate, impurities having a structure similar to that of a photolytically acid generating agent and exhibiting low thermal stability are considered to remain. For example, the photolytically acid generating agent is a triaryl sulfonium salt derivative, it is possible that a diaryl sulfonium salt or a bis(triaryl sulfonium salt) is incorporated. The thermal stability of these derivatives is lower than that of a triaryl sulfonium salt as a main component. In such a case, the following purification process may be provided to eliminate such impurities.

(Purification Process)

The purification process contains a step to heat a photolytically acid generation agent to generate protic acids via thermal decomposition of impurities and a step for proton elimination canted out after the heating step. In the case of an aryl sulfonium salt, preferable is a process containing a heating step for heating in the temperature range of 60° C. to less than the decomposition temperature (° C.) of the aryl sulfonium salt and a step for proton elimination carried out after the heating step, provided that when the heating temperature of the heating step is t (° C.) and the heating duration is h (hr), the relationship of K−59h≧82 is satisfied.

Herein, K is a value obtained by integration from x=0 to x=h via determination of a heating duration heating temperature curve, provided that heating duration his designated as the x axis and heating temperature t is designated as they axis.

As specific methods of the heating treatment, listed are a method to heat a solvent dissolving an aryl sulfonium salt and a method to heat solid particles of an aryl sulfonium salt. Of these, the method to heat a solvent dissolving an aryl sulfonium salt is preferable.

As the solvent, protic or non-protic polar organic solvents are preferably used, depending on the structure of a triaryl sulfonium salt.

For example, listed are alcohols such as ethanol or propanol; ethers and acetals such as anisol, diethyl ether, dioxane, or tetrahydrofuran; ketones such as acetone, isophorone, or methyl ethyl ketone; esters such as ethyl acetate, ethyl lactate, or γ-butyrolactone; polyols and derivatives thereof such as propylene carbonate, ethylene glycol diacetate, or diethylene glycol diethyl ether; organic acids and anhydrides thereof such as acetic acid, propionic acid, or acetic anhydride; nitrogen-containing compounds such as 2-pyrrolidone, N-methylpyrrolidone, or N-methylformamide; and sulfur-containing compounds such as diphenyl sulfone, dimethyl sulfoxide, or sulfolane. Of these, dioxane or propylene carbonate is preferably used.

Heating temperature t (° C.) of the heating step is the temperature of a solvent in the case of a method to heat a solvent dissolving an aryl sulfonium salt, or the ambience temperature in the case of a method to heat solid particles.

With the heating temperature of less than 60° C., when an ink-jet ink is stored for a long-terra period, ejection failure occurs.

When K−59h is less than 82 in the relationship (K−59h≧82), ejection failure occurs after long-term storage.

In the heating treatment, heating temperature may be changed within the above range.

Heating temperature his 60° C. to less than the decomposition temperature of an aryl sulfonium salt but is preferably 60 to (the decomposition temperature (° C.) of the aryl sulfonium salt—10° C.)) to treat the aryl sulfonium salt with no decomposition.

The proton elimination step is one to eliminate protons considered to generate by heating via any of the following treatments: alkali treatment of making contact with an alkaline agent, chromatographic separation via various chromatographs, and water treatment of making contact with water.

The alkali treatment is a treatment to allow an aryl sulfonium salt to be brought into contact with an alkaline agent. The alkali treatment is carried out via a method to make contact with the alkaline agent in a solvent dissolving the aryl sulfonium salt. As a solvent to dissolve the aryl sulfonium salt in the alkali treatment, a solvent used in the above heating treatment is employed. The alkaline agent includes carbonates of alkali metals and alkaline earth metals such as potassium carbonate or sodium carbonate. The method to make contact includes a method to stir a mixture of an aryl sulfonium salt solution and an alkaline agent. The alkali treatment temperature is preferably 10° C.—(the decomposition temperature (° C.) of an aryl sulfonium salt—10 (° C.)), but specifically preferably 10° C.-40° C. since no heating and cooling apparatuses are required. After the alkali treatment step, a step to eliminate water via dehydration treatment using magnesium sulfate is preferably provided.

The chromatographic separation treatment includes, for example, a method in which the above alkaline agent solution is passed through a column filled with a cationic exchange resin and then the aryl sulfonium salt solution having been heat-treated is passed thereto.

The water treatment can be carried out by stirring a mixture of a solvent dissolving an aryl sulfonium salt and water.

<<Sensitizers>>

In the ink of the present invention, a sensitizer can be used for a polymerization initiator (a photolytically acid generating agent). As the sensitizer, when a sulfonium salt is used as a photo-initiator, anthracene and anthracene derivatives (e.g., Adekaoptomer SP-100 produced by Asahi Denka Kogyo K.K., diethoxyanthracene, and dibutoxyanthracene) are listed. In the case of an iodonium salt photo-initiator, thioxanthones are usable. These sensitizers can be used individually or in combinations of at least 2 types. The added amount thereof is preferably 0.2-5 parts by mass based on 100 parts by mass of a cationically polymerizable compound, more preferably 0.5-4 parts by mass. In the case of less than 0.2 parts by mass, poor sensitizing effects are produced. In contrast, in the case of more than 5 parts by mass, the problems of coloration of a sensitizer itself and of coloration due to decomposition of the sensitizer.

As specific examples of polycyclic aromatic compounds, carbazole derivatives, and thioxanthone derivatives, which can also be used for a sensitizer, having at least one group from a hydroxyl group and a substitutable aralkyloxy group and alkoxy group as a substituent, the following compounds can be cited.

As the polycyclic aromatic compounds, naphthalene derivatives, anthracene derivatives, chrysene derivatives, and phenanthrene derivatives are preferable. The alkoxy group being a substituent preferably has a carbon number of 1-18, specifically preferably 1-8. The aralkyloxy group preferably has a carbon number of 7-10. Of these, a benzoyloxy group and a phenethyloxy group having a carbon number of 7 or 8 are specifically preferable.

These sensitizers include, for example, naphthalene derivatives including naphthol derivatives and condensates with formalin such as 1-naphthol, 2-naphthol, 1-methoxynaphthalene, 1-stearyloxynaphthalene, 2-methoxynaphthalene, 2-dodecyloxynaphthalene, 4-methoxy-1-naphthol, glycidyl-1-naphthyl ether, 2-(2-naphthoxy)ethyl vinyl ether, 1,4-dihydroxynaphthalene, 1,5-dihydroxynaphthalene, 1,6-dihydroxynaphthalene, 2,7-dihydroxynaphthalene, 2,7-dimethoxynaphthalene, 1,1'-thiobis(2-naphthol), 1,1'-bi-2-naphthol, 1,5-naphthyldiglycidyl ether, 2,7-di(2-vinyloxyethyl)naphthyl ether, 4-methoxy-1-naphthol, or ESN-175 (an epoxy resin produced by Nippon Steel Chemical Ca, Ltd.) or its series; anthracene derivatives such as 9,10-dimethoxyanthracene, 2-ethyl-9,10-dimethoxyanthracene, 2-t-butyl-9,10-dimethoxyanthracene, 2,3-dimethyl-9,10-dimethoxyanthracene, 9-methoxy-10-methylanthracene, 9,10-diethoxyanthracene, 2-ethyl-9,10-diethoxyanthracene, 2-t-butyl-9,10-diethoxyanthracene, 2,3-dimethyl-9,10-diethoxyanthracene, 9-ethoxy-10-methylanthracene, 9,10-dipropoxyanthracene, 2-ethyl-9,10-dipropoxyanthracene, 2-t-butyl-9,10-dipropoxyanthracene, 2,3-dimethyl-9,10-dipropoxyanthracene, 9-isopropoxy-10-methylanthracene, 9,10-dibenzyloxyanthracene, 2-ethyl-9,10-dibenzyloxyanthracene, 2-t-butyl-9,10-dibenzyloxyanthracene, 2,3-dimethyl-9,10-dibenzyloxyanthracene, 9-benzyloxy-10-methylanthracene, 9,10-di-α-methylbenzyloxyanthracene, 2-ethyl-9,10-di-α-methylbenzyloxyanthracene, 2-t-butyl-9,10-di-α-methylbenzyloxyanthracene, 2,3-dimethyl-9,10-di-α-methylbenzyloxyanthracene, 9-α-methylbenzyloxy)-10-methylanthracene, 9,10-di(2-hydroxyethoxy)anthracene, or 2-ethyl-9,10-di(2-carboxyethoxy)anthracene; chrysene derivatives such as 1,4-dimethoxychrysene, 1,4-diethoxychrysene, 1,4-dipropoxychrysene, 1,4-dibenzyloxychrysene, or 1,4-di-α-methylbenzyloxychrysene; and phenanthrene derivatives such as 9-hydroxyphenanthrene, 9,10-dimethoxyphenanthrene, or 9,10-diethoxyphenanthrene. Of these derivatives, 9,10-dialkoxyanthracene derivatives which may have an alkyl group of a carbon number of 1-4 are specifically preferable, and as the alkoxy group, a methoxy group and an ethoxy group are preferable.

As the carbazole derivatives, carbazole, N-ethylcarbazole, N-vinylcarbazole, and N-phenylcarbazole are listed.

Further, as the thioxanthone derivatives, for example, thioxanthone, 2,4-dimethylthioxanthone, 2,4-diethylthioxanthone, isopropylthioxanthone, and 2-chlorothioxanthone are listed.

<<Other Additives>>

In the ink-jet ink of the present invention, for the intended purposes to improve ejection stability, packaging container suitability for a print heat and ink, storage stability, image stability, and other performance properties, there can appropriately be used, in addition to the above compounds, various well-known additives such as surfactants, lubricants, fillers, antifoamers, gelling agents, thickeners, specific resistance regulators, coated film forming agents, UV absorbents, antioxidants, anti-fading agents, antifungal agents, or anti-corrosion agents, if desired.

Further, a small amount of a solvent such as an ester-based solvent, an ether-based solvent, an ether ester-based solvent, a ketone-based solvent, an aromatic hydrocarbon solvent, or a nitrogen-containing organic solvent can also be added as appropriate.

Specific examples thereof include dimethyl sulfoxide, diethyl sulfoxide, methyl ethyl sulfoxide, diphenyl sulfoxide, tetraethylene sulfoxide, dimethyl sulfone, methyl ethyl sulfone, methyl isopropyl sulfone, methyl hydroxyethyl sulfone, sulfolane, N-methyl-2-pyrrolidone, 2-pyrrolidone, β-lactam, N,N-dimethylformamide, N,N-diethylformamide, N,N-dimethylacetamide, 1,3-dimethyl-2-imidazolidinone, 3-methyl-2-oxazolidinone, γ-butyrolactone, γ-valerolactone, isophorone, cyclohexane, propylene carbonate, anisol, methyl ethyl ketone, acetone, ethyl lactate, butyl lactate, dioxane, ethyl acetate, butyl acetate, diethylene glycol dimethyl ether, dibasic acid esters, and methoxybutyl acetate. Any of these is added in the ink at 1.5-30%, preferably at 1.5-15% to enhance adhesion properties to a resin recording medium such as polyvinyl chloride.

Other specific examples include alkylene glycol monoalkyl ethers such as diethylene glycol monoethyl ether, Methylene glycol monomethyl ether, dipropylene glycol monomethyl ether, or tripropylene glycol monomethyl ether; alkylene glycol dialkyl ethers such as ethylene glycol dibutyl ether or tetraethylene glycol dimethyl ether; and alkylene glycol monoalkyl ether acetates such as ethylene glycol monobutyl ether acetate, as well as diethylene glycol diethyl ether, dipropylene glycol dimethyl ether, dipropylene glycol diethyl ether, ethylene glycol diacetate, and propylene glycol diacetate.

<<Ink Physical Properties>>

The ink of the present invention preferably has, as physical properties, physical properties values similar to those of a common curable ink-jet ink. Namely, the ink is preferably allowed to exhibit a viscosity of 2-50 mPa·s at 25° C., shear rate dependency as little as possible, and a surface tension of 22-35 in N/m at 25° C.; to have, other than pigment particles, no gel substances having an average particle diameter of more than 1.0 μm; to exhibit a conductivity of at most 10 μS/cm; and to induce no electrical corrosion in the interior of the head. In a continuous type, conductivity needs to be adjusted using an electrolyte, and in this case, the conductivity needs to be adjusted at 0.5 mS/cm or more.

In addition, in physical properties of the ink of the present invention, a more preferable embodiment is that when DSC determination of the ink is carried out at a dropping rate of 5° C./minute in the range of 25° C. to −25° C., the calorific value per mass is not exhibited at 10 mJ/mg or more as the exothermic peak. Selection of materials based on the constitution of the present invention makes it possible to prevent heat generation of a given amount or more based on the DSC determination. With such a constitution, even when an ink is stored at low temperatures, generation of gel and deposits can be prevented.

<<Ink Preparation Method>>

The ink-jet ink of the present invention can be produced by sufficiently dispersing a pigment together with a vinyl ether compound serving as an actinic energy radiation curable compound and a pigment disperser using a common homogenizer such as a sand mill. It is preferable that a highly concentrated liquid of a pigment be previously prepared, followed by being diluted with an actinic energy radiation curable compound. Dispersion using such a common homogenizer enables to carry out adequate dispersion. Thereby, no excessive amount of dispersion energy is required and excessively long dispersion duration is unnecessary, whereby properties of an ink component tend not to be changed during dispersion and an ink exhibiting excellent stability can be prepared. The thus-prepared ink is preferably filtered with a filter of a pore diameter of almost 3 μm, more preferably at most 1 μm.

<<Recording Media>>

As recording media used for the ink-jet recording method of the present invention, a wide variety of all the synthetic resins having been used for various end use applications are covered, including, for example, polyester, polyvinyl chloride, polyethylene, polyurethane, polypropylene, acrylic resins, polycarbonate, polystyrene, acrylonitrile-butadiene-styrene copolymers, polyethylene terephthalate, and polybutadiene terephthalate. The thicknesses and shapes of these synthetic resin substrates are not specifically limited. In addition, metals, glass, and printing paper are also usable.

Specific examples of polyvinyl chloride which is one of the recording media used for the ink-jet recording method of the present invention include SOL-371G, SOL-373G, and SOL-4701 (produced by VIGteQnos Co. Ltd.); glossy vinyl chloride (produced by System Graph Co., Ltd.); KSM-VS, KSM-VST, and KSM-VT (produced by Kimoto Co., Ltd.); J-CAL-HGX, J-CAL-YHG, and J-CAL-WWWG (produced by Kyosyo Co., Ltd., Osaka); BUS MARK V400F vinyl and LITEcal V-600F vinyl (produced by Flexcon Co.); FR2 (produced by Hanwha Corp.); LLBAU13713 and LLSP20133 (produced by Sakurai Co., Ltd.); P-370B and P-400M (produced by Kanbo Pras Corp.); S02P, S12P, S13P, S14P, S22P, S24P, S34P, and S27P (produced by Grafityp Co.); P-223RW, P-224RW, P-249ZW, and P-284ZC (produced by Lintec Corp.); LKG-19, LPA-70, LPE-248, LPM-45, LTG-11, and LTG-21 (produced by Shinseisha Co., Ltd.); MP13023 (produced by Toyo Corp.); Napoleon Gloss glossy vinyl chloride (produced by Niki Inc.); JV-610 and Y-114 (produced by IKC Co., Ltd.); NIJ-CAPVC and NIJ-SPVCGT (produced by Nitie Corp.); 3101/H12/P4, 3104/H12/P4, 3104/H12/P4S, 9800/H12/P4, 3100/H12/R2, 3101/H12/R2, 3104/H12/R2, 1445/H14/P3, and 1438/One Way Vision (produced by Intercoat Co.); JT5129PM, JT5728P, JT5822P, JT5829P, JT5829R, JT5829PM, JT5829RM, and JT5929PM (produced by Mactac AG); MPI1005, MPI1900, MPI2000, MPI2001, MPI2002, MP13000, MPI3021, MPI3500, and MPI3501 (produced by Avery Corp.); AM-101G and AM-501G (produced by Gin-Ichi Corp.); FR2 (produced by Hanwha. Japan Co., Ltd.), AY-15P, AY-60P, AY-80P, DBSP137GGH, and DBSP137GGL (produced by Insight Co.); SJT-V200F and SJT-V400E-1 (produced by Hiraoka & Co., Ltd.); SPS-98, SPSM-98, SPSH-98, SVGL-137, SVGS-137, MD3-200, MD3-301M, MD5-100, MD5-101M, and MD5-105 (produced by Metamark UK Ltd.); 640M, 641G, 641M, 3105M, 3105SG, 3162G, 3164G, 3164M, 3164XG, 3164XM 31650, 3165SG, 3165M, 3169M, 3451SG, 3551G, 3551M, 3631, 3641M, 3651G, 3651M, 3651SG, 3951G, and 3641M (produced by Orafol Europe GmbH); SVTL-HQ130 (Lanai Corporation Inc.); SP300 GWF and SPCLEARAD vinyl (produced by Catalina Co.); RM-SJR (produced by Ryoyoshoji Co., Ltd.), Hi Lucky and New Lucky PVC (produced by LG Corp.); SIY-110, SIY-310, and SIY-320 (produced by Sekisui Chemical Co., Ltd); PRINT MI Frontlit and PRINT XL Light weight banner (produced by Endutex S.A.); RIJET 100, RIJET 145, and RIJET 165 (produced by Ritrama S.p.A.); NM-SG and NM-SM (produced by Nichiei Kakoh Co., Ltd.); LTO3GS (Rukio Co., Ltd.); Easy Print 80 and Performance Print 80 (produced by JetGraph Co., Ltd.); DSE 550, DSB 550, DSE 800G, DSE 802/137, V250WG, V300WG, and V350WG (produced by Hexis AG); and Digital White 6005PE and 6010PE (produced Multi-fix. N.V.).

Further, for recording media formed of a resin substrate containing no plasticizer or a nonabsorbable inorganic substrate as a component, one type of substrate can be used alone or plural types of substrates can be used in combination using any of the following substrates as a component. The resin substrate containing no plasticizer used in the present invention includes, for example, ABS resins, polycarbonate (PC) resins, polyacetal (POM) resins, polyamide (PA) resins, polyethylene terephthalate (PET) resins, polyimide (PI) resins, acrylic resins, polyethylene (PE) resins, polypropylene (PP) resins, hard polyvinyl chloride (PVC) resins containing no plasticizer.

These resins are characterized by containing no plasticizer. Other characteristics such as thickness, shape, color, softening point, or hardness are not specifically limited.

As recording media used in the present invention, preferable are ABS resins, PET resins, PC resins, POM resins, PA resins, PI resins, PVC resins containing no plasticizer, acrylic resins, PE resins, and PP resins. But of these, ABS resins, PET resins, PC resins, PA resins, PVC resins containing no plasticizer, and acrylic resins are more preferable.

Further, the nonabsorbable inorganic substrate used in the present invention includes, for example, glass plates, metal plates such as iron or aluminum, and ceramic plates. These inorganic substrates are characterized by having no ink-absorbable layer on the surface. With regard to these nonabsorbable inorganic substrates, other characteristics such as thickness, shape, color, softening point, or hairiness are not specifically limited.

<<Ink-Jet Recording Method>>

An ink-jet head used for image formation by ejecting the ink-jet ink of the present invention may be either an on-demand system or a continuous system. Further, as an ejection system, there may be used any of the ejection methods including an electrical-mechanical conversion system (e.g., a single cavity type, a double cavity type, a vendor type, a piston type, a share mode type, and a shared-wall type) and an electrical-thermal conversion system (e.g., a thermal ink-jet type and a BUBBLE JET (a registered trademark) type).

The ink-jet recording method of the present invention is a recording method in which the actinic energy radiation curable ink-jet ink of the present invention is ejected onto a recording medium and then the ink is cured via irradiation of actinic energy radiation such as UV radiation.

(Actinic Energy Radiation Irradiation Conditions after Ink Deposition)

In the ink-jet recording method of the present invention, as an irradiation condition of actinic energy radiation, actinic energy radiation is preferably irradiated 0.001 second-1.0 second after ink deposition, more preferably 0.001 second-0.5 second.

To form highly detailed images, it is specifically preferable that the irradiation timing be as early as possible.

The irradiation method of actinic energy radiation is not specifically limited and can be performed, for example, by any of the following methods.

The methods include a method as described in JP-A No. 60-132767 in which radiation sources axe arranged on both sides of the head unit, and the head and the radiation sources are scanned via a shuttle system; then irradiation is carried out within a specified period of time after ink deposition; and further, curing is completed with another radiation source being stationary; a method employing optical fibers as described in U.S. Pat. No. 6,145,979; and a method in which UV radiation is irradiated to a recording portion by hitting collimated radiation onto a mirror surface provided on the side of the head unit.

In the ink-jet recording method of the present invention, any of these irradiation methods can be used.

Further, the following method is also one of the preferred embodiments: namely, actinic energy radiation irradiation is divided into two stages; initially, actinic energy radiation is irradiated 0.001-2.0 seconds after ink deposition via the above method; and after completion of entire printing, actinic energy radiation is fisher irradiated.

Dividing actinic energy radiation irradiation into two stages makes it possible to inhibit contraction of a recording medium which tends to occur during ink curing.

(Total Ink Film Thickness after Ink Deposition)

In the ink-jet recording method of the present invention; after deposition of an ink onto a recording medium and then curing via irradiation of actinic energy radiation, the total ink film thickness is preferably 2-20 µm from the viewpoint of curling and wrinkling of a recording medium and texture change of the recording medium.

Herein, the term "total ink film thickness" refers to the maximum value of ink film thickness of an image recorded on a recording medium. The meaning of the above total ink film thickness is the same as in cases in which recording is conducted via a single color ink-jet recording method, as well as a 2-color superimposing (secondary color), 3-color superimposing, or 4-color superimposing (white ink base) ink-jet recording method.

(Ink Heating and Ejection Conditions)

In the ink-jet recording method of the present invention, actinic energy radiation is preferably irradiated while an actinic energy radiation curable ink-jet ink is heated, from the viewpoint of ejection stability.

Heating temperature is preferably 35-100° C. While the temperature is kept at 35-80° C., actinic energy radiation is more preferably irradiated from the viewpoint of ejection stability.

The method to heat an ink-jet ink at a predetermined temperature and to maintain the temperature is not specifically limited, including, for example, a method in which an ink feeding system such as an ink tank constituting the head carriage, a feeding pipe, and a pre-chamber ink tank just prior to the head, piping with filters, and a piezo head are thermally insulated and heated to the predetermined temperature using a panel heater, a ribbon heater, or temperature regulated water.

The controlled width of ink temperature is preferably in the range of a set temperature of ±5° C., more preferably a set temperature of ±2° C., specifically preferably a set temperature of ±1° C. in view of ejection stability.

The droplet amount ejected from each nozzle is preferably 2-20 pl in view of recording speed and image quality.

Next, an ink-jet recording apparatus (hereinafter referred to simply as a recording apparatus), which can be used for the ink-jet recording method of the present invention, will now be described.

The recording apparatus is described with appropriate reference to Drawings.

FIG. 1 is a front elevation view showing the constitution of a main section of a recording apparatus.

Recording apparatus 1 is constituted by having head carriage 2, recording head 3, irradiation member 4, and platen section 5.

In recording apparatus 1, platen section 5 is arranged under recording medium P.

Platen section 5 functions to absorb UV radiation and absorbs any extra UV radiation which has passed through recording medium P.

Thereby, highly detailed images can be reproduced very stably.

Recording medium P is guided by guide member 6 and is conveyed from the front to the rear in FIG. 1 via the action of a conveying member (not shown). A head scraping member (not shown) allows head carriage 2 to reciprocate in direction Y in FIG. 1, whereby recording head 3 held by head carriage 2 is scanned.

Head carriage 2 is arranged on the upper side of recording medium P, and a plurality of recording heads 3, described later, corresponding to the number of colors used for image printing on recording medium P, are housed in such a manner that the ejection orifices are arranged on the lower side.

Head carriage 2 is arranged for recording apparatus 1 main body to enable reciprocation in direction Y in FIG. 1. Via driving of the head scanning member, reciprocation is conducted in direction Y in FIG. 1.

Herein, FIG. 1 is drawn so that head carriage 2 houses recording heads 3 for white (W), yellow (Y), magenta (M), cyan (C), black (K), light yellow (Ly), light magenta (Lm), light cyan (Lc), light black (Lk), and white (W). In practice, the number of colors of recording heads 3 housed in head carriage 2 is appropriately determined.

Recording head 3 ejects an actinic energy radiation curable ink-jet ink (for example, a UV curable ink) fed by an ink feeding member (not shown) onto recording medium P from the ejection orifice via the action of a plurality of ejection members (not shown) provided within the interior.

Recording head 3 moves from one end of recording medium P to the other end thereof in direction Y in FIG. 1 via driving of the head scanning member. Then, during this scanning, the UV ink is ejected onto a specified area (being a depositable area) of recording medium P in the form of ink droplets and then the ink droplets are deposited onto the depositable area.

The above scanning is carried out at a specified number of times to eject the actinic energy radiation curable inkjet ink onto one depositable area. Thereafter, recording medium P is appropriately moved from the front to the rear in FIG. 1 via the conveying member. While scanning using the scanning member is carried out again, the UV ink is ejected onto a next depositable area adjacent to the above depositable area in the rearward direction in FIG. 1.

The above operation is repeated, and the actinic energy radiation curable ink-jet ink is ejected from recording head 3 under synchronization with the head scanning member and the conveying member to form an image containing an aggregate of the actinic energy radiation curable ink-jet ink droplets on recording medium P.

Irradiation member 4 is constituted by having a UV lamp which emits UV radiation having a specific wavelength range at stable exposure energy and a filter which transmits UV radiation of a specific wavelength.

Herein, applicable UV lamps include mercury lamps, metal halide lamps, excimer lasers, UV lasers, cold-cathode tubes, hot-cathode tubes, blacklights, and LEDs (light emitting diodes). Of these, preferable are band-shaped metal halide lamps, cold-cathode tubes, hot-cathode tubes, mercury lamps, and blacklights.

Preferable are low-pressure mercury lamps, hot-cathode tubes, cold-cathode tubes, and sterilization lamps especially emitting UV radiation of a wavelength of 252 nm, from the viewpoint of efficient bleeding prevention and dot diameter control.

Use of a black light as a radiation source for irradiation member 4 makes it possible to inexpensively produce irradiation member 4 to cure a UV ink.

Irradiation member 4 is nearly similar in shape to the maximum capable of being set for recording apparatus (a UV ink-jet printer) 1 or is larger in shape than the depositable area among the depositable areas on which the UV ink is ejected via one scanning of recording head 3 driven by the head scanning member.

Irradiation member 4 is arranged via fixation on both sides of head carriage 2 to be nearly parallel to recording medium P.

As described above, illuminance in the ink ejection section is regulated, of course, by shielding entire recording head 3 from light. Further, it is effective that distance h1 between irradiation member 4 and recording medium P is set to be smaller than distance h2 between ink ejection section 31 of recording head 3 and recording medium P (namely, h1<h2); and also distance d between recording head 3 and irradiation member 4 is set to be far (namely, d is set to be large).

Still further, it is more preferable that bellows structure 7 be arranged between recording head 3 and irradiation member 4.

Herein, it is possible to appropriately change the wavelength of UV radiation irradiated by irradiation member 4 by replacing a UV lamp or a filter provided for irradiation member 4.

FIG. 2 is a top view showing another example of the constitution of a main section of an ink-jet recording apparatus.

The ink-jet recording apparatus shown in FIG. 2 is referred to as a line head system, and a plurality of ink-jet recording heads 3 of individual colors are fixed and arranged on head carriage 2 to cover the entire width of recording medium P.

On the other hand, on the downstream side of head carriage 2, namely in the rear of head carriage 2 in the direction of conveying recording medium P, irradiation member 4 is provided via arrangement to cover the entire ink printing area, similarly to cover the entire width of recording medium P.

As a UV lamp used for irradiation member 4, one similar to the one shown in FIG. 1 can be used.

In this line head system, head carriage 2 and irradiation member 4 are fixed and only recording medium P is conveyed to carry out image formation via ink ejection and curing.

EXAMPLES

The present invention will now specifically be described with reference to Examples that by no means limit the scope of the present invention. Incidentally, the expression of "part" or "%" referred to in Examples represents "part by mass" or "% by mass" unless otherwise specified.

Example 1

<<Ink Preparation>>
[Preparation of Pigment Dispersions]

Pigment dispersions 1-5 each were obtained by dispersing, at the same time, the pigment, pigment disperser A (AJISPER P13824, produced by Ajinomoto Fine-Techno Co., Inc.), and triethylene glycol divinyl ether (VE-1) described in Table 1 in a sand mill for 4 hours.

[Preparation of Inks 1-27]

Subsequently, as described in Table 1, cationically polymerizable compounds, a polymer (polymer A), a photo-cationic polymerization initiator (PI-1), a cationic polymerization inhibitor (2MAE), and a sensitizer (DEA) were added to each of the thus-prepared pigment dispersion at a predetermined amount of each and the resulting mixture was dissolved, followed by filtration using a membrane filter of 0.85 μm to prepare inks 1-27.

Herein, the pigments and the disperser used to prepare above inks 1-27 were used after having been washed with ion-exchange water and dehydrated to dryness. Further, each cationically polymerizable compound was previously purified via distillation. By these purification treatments, halogen ions were sufficiently eliminated. Still further, the photo-cationic polymerization initiator was used after having been washed with ion-exchange water and then dehydrated to dryness. Then, the number of times of methanol washing and ion-exchange water washing was appropriately controlled to adjust thermally acid generating amount (the difference in hydrogen ion concentration (mol/L) in solutions before and after refluxing treatment when a dioxane solution of 0.02 mol/L of a photolytically acid generating agent is refluxed for 20 hours) at $1.0 \times 10^{-4}$ mol/L.

When the halogen ion content of each of the prepared inks was less than the halogen ion content described in Table 1, potassium chloride was appropriately added to achieve the content described in Table 1.

[Determination of the Halogen Ion Content of Each Ink]

The halogen ion content of each ink prepared above is determined as follows: 10 g of the ink was precisely weighed and 30 ml of ultrapure water is added for stirring for 30 minutes, followed by standing for 1 hour and filtration, and then the resulting liquid after filtered is quantitatively analyzed via an ion chromatographic analysis method. The breakdown of the halogen ion content is as follows: in every ink, the contents of fluorine ions and iodine ions each were at most 1.0 μg/g; the content of bromine ions was at most 5.0 μg/g; and most of the remainder was chlorine ions.

TABLE 1

| Ink No. | Pigment Dispersion | | | | Cationically Polymerizable Compound | | | | | | Polymer | Cationic Polymerization Initiator | Polymerization Inhibitor | Sensitizer | Halogen Ion Content | Remarks |
|---|---|---|---|---|---|---|---|---|---|---|---|---|---|---|---|---|
| | | Pigment | | Disperser A | Vinyl Ether Compound | | | | Others | | Polymer A | PI-1 | 2MAE | DEA | | |
| | No. | Type | Added Amount | | VE-1 | VE-1 | VE-3 | VE-4 | OXT | EP | | | | | (ppm) | |
| 1 | 1 | PB | 2.5 | 1.0 | 12 | 54.48 | 10 | 15 | — | — | — | 4.0 | 0.02 | 1.0 | 10 | Inv. |
| 2 | 1 | PB | 2.5 | 1.0 | 12 | 54.48 | 10 | 15 | — | — | — | 4.0 | 0.02 | 1.0 | 40 | Inv. |
| 3 | 1 | PB | 2.5 | 1.0 | 12 | 54.48 | 10 | 15 | — | — | — | 4.0 | 0.02 | 1.0 | 100 | Inv. |
| 4 | 1 | PB | 2.5 | 1.0 | 12 | 54.48 | 10 | 15 | — | — | — | 4.0 | 0.02 | 1.0 | 250 | Comp. |
| 5 | 1 | PB | 2.5 | 1.0 | 12 | 54.48 | 10 | 5 | 8 | 2 | — | 4.0 | 0.02 | 1.0 | 2 | Inv. |
| 6 | 1 | PB | 2.5 | 1.0 | 12 | 54.48 | 10 | 5 | 8 | 2 | — | 4.0 | 0.02 | 1.0 | 10 | Inv. |
| 7 | 2 | PY | 3.0 | 1.0 | 12 | 53.98 | 10 | 5 | 8 | 2 | — | 4.0 | 0.02 | 1.0 | 10 | Inv. |
| 8 | 3 | PR | 4.0 | 1.0 | 12 | 52.98 | 10 | 5 | 8 | 2 | — | 4.0 | 0.02 | 1.0 | 10 | Inv. |
| 9 | 4 | CB1 | 2.0 | 1.0 | 12 | 54.98 | 10 | 5 | 8 | 2 | — | 4.0 | 0.02 | 1.0 | 10 | Inv. |
| 10 | 5 | Ti | 8.0 | 1.0 | 12 | 48.98 | 10 | 5 | 8 | 2 | — | 4.0 | 0.02 | 1.0 | 10 | Inv. |
| 11 | 1 | PB | 2.5 | 1.0 | 12 | 52.48 | 10 | 5 | 8 | 2 | 2.0 | 4.0 | 0.02 | 1.0 | 10 | Inv. |
| 12 | 1 | PB | 2.5 | 1.0 | 12 | 54.48 | 10 | 5 | 8 | 2 | — | 4.0 | 0.02 | 1.0 | 40 | Inv. |
| 13 | 1 | PB | 2.5 | 1.0 | 12 | 52.48 | 10 | 5 | 8 | 2 | 2.0 | 4.0 | 0.02 | 1.0 | 40 | Inv. |
| 14 | 1 | PB | 2.5 | 1.0 | 12 | 54.48 | 10 | 5 | 8 | 2 | — | 4.0 | 0.02 | 1.0 | 100 | Inv. |
| 15 | 1 | PB | 2.5 | 1.0 | 12 | 52.48 | 10 | 5 | 8 | 2 | 2.0 | 4.0 | 0.02 | 1.0 | 100 | Inv. |
| 16 | 1 | PB | 2.5 | 1.0 | 12 | 54.48 | 10 | 5 | 8 | 2 | — | 4.0 | 0.02 | 1.0 | 250 | Comp. |
| 17 | 1 | PB | 2.5 | 1.0 | 12 | 54.48 | 10 | — | 10 | 5 | — | 4.0 | 0.02 | 1.0 | 10 | Inv. |
| 18 | 1 | PB | 2.5 | 1.0 | 12 | 39.48 | — | — | 30 | 10 | — | 4.0 | 0.02 | 1.0 | 10 | Inv. |
| 19 | 1 | PB | 2.5 | 1.0 | 12 | 39.48 | — | — | 30 | 10 | — | 4.0 | 0.02 | 1.0 | 40 | Inv. |
| 20 | 1 | PB | 2.5 | 1.0 | 12 | 36.48 | — | — | 33 | 10 | — | 4.0 | 0.02 | 1.0 | 40 | Comp. |
| 21 | 1 | PB | 2.5 | 1.0 | 12 | 39.48 | — | — | 30 | 10 | — | 4.0 | 0.02 | 1.0 | 100 | Inv. |
| 22 | 1 | PB | 2.5 | 1.0 | 12 | 39.48 | — | — | 30 | 10 | — | 4.0 | 0.02 | 1.0 | 250 | Comp. |
| 23 | 1 | PB | 2.5 | 1.0 | 12 | — | — | — | 60 | 19.48 | — | 4.0 | 0.02 | 1.0 | 10 | Comp. |
| 24 | 1 | PB | 2.5 | 1.0 | 12 | — | — | — | 60 | 19.48 | — | 4.0 | 0.02 | 1.0 | 40 | Comp. |
| 25 | 1 | PB | 2.5 | 1.0 | 12 | — | — | — | 60 | 19.48 | — | 4.0 | 0.02 | 1.0 | 100 | Comp. |

TABLE 1-continued

| | Pigment Dispersion | | | | Cationically Polymerizable Compound | | | | | | Polymer | *1 | Cationic Polymerization Inhibitor | Sensi-tizer | Halogen Ion Content | |
|---|---|---|---|---|---|---|---|---|---|---|---|---|---|---|---|---|
| | Pigment | | | | Vinyl Ether Compound | | | | Others | | | | | | | |
| Ink No. | No. | Type | Added Amount | Disperser A | VE-1 | VE-1 | VE-3 | VE-4 | OXT | EP | Polymer A | PI-1 | 2MAE | DEA | (ppm) | Remarks |
| 26 | 1 | PB | 2.5 | 1.0 | 12 | — | — | — | 60 | 19.48 | — | 4.0 | 0.02 | 1.0 | 250 | Comp. |
| 27 | 1 | PR | 2.5 | 1.0 | 12 | 52.48 | 10 | 5 | 8 | 2 | — | 4.0 | 0.02 | 1.0 | 1 | Inv. |

*1 Photo-cationic Polymerization Initiator, Inv.: inventive, Comp.: comparative

Herein, the detail of each additive used to prepare each ink abbreviated in Table 1 is described below. Further, the added amount of each additive quantified in Table 1 is expressed by parts by mass.

(Pigments)

PY: C.I. Pigment Yellow 150 (surface-treated, purified)
PR: C.I. Pigment Red 122 (surface-treated, purified)
PB: C.I. Pigment Blue 15:4 (surface-treated, purified)
CBl: carbon black (surface-treated, purified)
Ti: titanium oxide (surface-treated, purified)

(Pigment Disperser)

Disperser A: polymer disperser PB824 (produced by Ajinomoto Fine-Techno Co., Inc.)

(Cationically Polymerizable Compounds)

<Vinyl Ether Compounds>

VE-1: triethylene glycol divinyl ether (purified, viscosity at 25° C.: 3.4 mPa·s)
VE-3: diethylene glycol divinyl ether (purified, viscosity at 25° C.: 2.2 mPa·s)
VE-4: ethylene oxide-modified trimethylolpropane triacrylate trivinyl ether (purified, viscosity at 25° C.: 39.8 mPa·s)

<Other Canonically Polymerizable Compounds>

OXT: OXT221, oxetane compound (viscosity at 25° C.: 13 mPa·s, produced by Toagosei Co., Ltd.)
EP: CEL2021P, alicyclic epoxy compound (viscosity at 25° C.: 250 mPa·s, produced by Daicel Chemical Industries, Ltd.)

(Polymer)

Polymer A: polyether polyurethane oligomer (oxyethylene structure contained, viscosity at 25° C.: 450 mPa·s)

(Photo-cationic Polymerization Initiator)

PI-1: used after washed with ion-exchange wafer and dehydrated to dryness; and used as a solution (50% by mass solution) of (4-phenylthiophenyl)diphenyl sulfonium hexafluorophosphate dissolved in propylene carbonate in which the initiator had been washed with methanol and ion-exchange water to eliminate halogen ions for purification and to adjust thermally acid generating amount.

(Cationic Polymerization Inhibitor)

2MAE: 2-methylaminoethanol (Sensitizer)

DEA: diethoxyanthracene

<<Evaluation of the Inks>>

Each of the prepared inks was evaluated based on the following methods.

(Evaluation of Continuous Ejection Stability)

Using piezo head 512SH (produced by Konica Minolta IJ Technologies, Inc.), 1 L of each ink was continuously ejected at a frequency of 20 kHz and then comparison with the ejection state immediately after ejection was made. Continuous ejection stability was evaluated based on the following criteria.

A: Ejection accuracies before and after continuous ejection were unchanged at all.
B: Accuracy error of ejection was slightly degraded after continuous ejection but was recovered by cleaning.
C: Accuracy error of ejection was degraded after continuous ejection and was not recovered even by cleaning.

(Evaluation of Nozzle Ink Repellency)

The nozzle plate member (exhibiting ink repellency) used for above piezo head 512SH was immersed in each ink at 60° C. for 4 days, and thereafter, whether or not the ink repellency was maintained was visually confirmed. Nozzle ink repellency was evaluated based on the following criteria.

A: Ink repellencies of the nozzle plate before and after immersion in an ink were unchanged at all.
B: Ink repellency was slightly degraded after immersion in an ink but was recovered by cleaning.
C: No ink repellency was expressed after immersion in an ink and was not recovered even by cleaning.

(Evaluation of High Temperature Stability)

Each ink was stored at 70° C. for 4 days and then the viscosity thereof at 25° C. was determined using an oscillating viscometer (VISCOMATE VM-1G-MH, produced by Yamaichi Co., Ltd). High temperature stability was evaluated based on the following criteria.

A: Viscosity variation rate before and after high temperature treatment is less than 5%.
B: Viscosity variation rate before and after high temperature treatment is 5%-less than 10%.
C: Viscosity variation rate before and after high temperature treatment is at least 10%.

<<Formed Image Evaluation>>

(Evaluation of Curability)

Under an ambience of 25° C. and 70% RH, a solid image of a film thickness of 7 μm was printed on polyethylene terephthalate film using piezo head 512SH (produced by Konica Minolta IJ Technologies, Inc.) charged with each ink, followed by irradiation of each of the light intensities of 15, 40, and 100 mJ/cm$^2$ using a high pressure mercury lamp to form a cured film. The film surface immediately after curing was finger-touched to confirm the presence or absence of surface tackiness. Curability was evaluated based on the following criteria.

A: No tackiness is noted.
B: Slight tackiness is noted.
C: Definite tackiness is noted.

(Evaluation of Cured Film Flexibility)

A UV ink-jet printer mounted with piezo head 512SH (produced by Konica Minolta IJ Technologies, Inc.) and an LED of 365 can was charged with each ink and a solid image of 200% was formed on a tarpaulin substrate. Then, under an ambience of 25° C. and 55% RH, bending test was conducted 20 times in which the image formed side faced outward. Cured film flexibility was evaluated based on the following criteria.

A: No cracks are created even by strong bending.
B: Slight cracks are created by strong bending.
C: Cracks are created by strong bending and the bended portion turns white.

(Evaluation of Anti-Abrasion Properties)

A UV ink-jet printer mounted with piezo head 512SH (produced by Konica Minolta IJ Technologies, Inc.) and an LED of 365 nm was charged with each ink and a solid image of 100% was formed on a tarpaulin substrate. Then, under an ambience of 25° C. and 55% RH, the surface of the thus-formed solid image was rubbed with a nail. Anti-abrasion properties were evaluated based on the following criteria.

A: No scratches are created on the formed image surface.
B: Slight scratches remain on the formed image surface but a cured film is not scratched.
C: A formed image film is cut away.

(Evaluation of Solvent Resistance)

A UV ink-jet printer mounted with piezo head 512SH (produced by Konica Minolta Technologies, Inc.) and an LED of 365 ran was charged with each ink and a solid image of 100% was formed on a tarpaulin substrate. Then, the surface of the thus-formed solid image was rubbed 10 times with a cotton swab having been immersed in a mixed liquid of ethanol and ion-exchange water of 1:1. Solvent resistance was evaluated based on the following criteria.

A: No coloration resulting fauna a colorant removed from the image surface is present on the rubbing cotton swab and the formed image surface is unchanged.
B: The rubbing cotton swab is colored but the image surface is unaffected.
C: The image surface is peeled off resulting in small formed image density.

(Evaluation of Weather Resistance)

An ink was coated at a thickness of 3 μm on vinyl chloride film using a UV ink-jet printer mounted with piezo head 512SH (produced by Konica Minolta IJ Technologies, Inc.) and an LED of 365 nm charged with each ink. Then, a cured film was formed by irradiating UV radiation of 100 mJ using a high pressure mercury lamp. Using accelerating weather resistance tester QUV (produced by Q-Lab Corp.), a cycle of UV irradiation and humidification/condensation was carted out for 1 month, followed by visual observation of the resulting cured film state. Weather resistance was evaluated based on the following criteria.

A: A cured film is unchanged.
B: A cured film is slightly changed with respect to gloss.
C: A cured film is washed away, resulting in lowered density (Evaluation of Substrate Adhesion Properties)

Using piezo head 512LH (ink droplet amount: about 50 pl) (produced by Konica Minolta D. Technologies, Inc.), printing was carried out on white PET of a thickness of 100 μm (U51L74, produced by Teijin Ltd.) serving as a substrate at a resolution of 360×360 dpi under a condition of a cured film thickness of 10 μm. Then, UV irradiation of 100 mJ was conducted using a high pressure mercury lamp to form a cured film.

Subsequently, to evaluate adhesion properties between the thus-formed cured film and the substrate, a cellophane tape was allowed to adhere to the cured film surface. Thereafter, the cured film state after the cellophane tape was slowly peeled off was visually observed. Substrate adhesion properties were evaluated based on the following criteria.

A: No peeling of a cured film from the substrate was noted at all.
B: Peeling of a cured film from the substrate was slightly noted, which is, however, practically acceptable.
C: Peeling of a cured film from the substrate was apparently noted, resulting in practically unaccepted quality.

The thus-obtained results are listed in Table 2.

TABLE 2

| | Ink Evaluation | | | Formed Image Evaluation | | | | | | | |
|---|---|---|---|---|---|---|---|---|---|---|---|
| Ink No. | Nozzle Ink Repellency *2 | High Temperature Stability | Curability (*1) 15 | 40 | 100 | Cured Film Flexibility | Anti-abrasion Properties | Solvent Resistance | Weather Resistance | Substrate Adhesion Properties | Remarks |
| 1 | A | A | A | A | A | A | A | A | A | A | A | Inv. |
| 2 | A | A | A | A | A | A | A | A | A | A | A | Inv. |
| 3 | A | A | A | A | A | A | A | A | A | A | A | Inv. |
| 4 | B | A | B | C | C | C | A | C | C | C | B | Comp. |
| 5 | A | A | A | A | A | A | A | A | A | A | A | Inv. |
| 6 | A | A | A | A | A | A | A | A | A | A | A | Inv. |
| 7 | A | A | A | A | A | A | A | A | A | A | A | Inv. |
| 8 | A | A | A | A | A | A | A | A | A | A | A | Inv. |
| 9 | A | A | A | A | A | A | A | A | A | A | A | Inv. |
| 10 | A | A | A | A | A | A | A | A | A | A | A | Inv. |
| 11 | A | A | A | A | A | A | A | A | A | A | A | Inv. |
| 12 | A | A | A | A | A | A | A | A | A | A | A | Inv. |
| 13 | A | A | A | A | A | A | A | A | A | A | A | Inv. |
| 14 | A | A | A | A | A | A | A | A | A | A | A | Inv. |
| 15 | A | A | A | A | A | A | A | A | A | A | A | Inv. |
| 16 | B | A | B | C | C | C | A | C | C | C | B | Comp. |
| 17 | A | A | A | A | A | A | A | A | A | A | A | Inv. |
| 18 | A | A | A | A | A | A | A | A | A | A | A | Inv. |
| 19 | A | A | A | A | A | A | A | A | A | A | A | Inv. |
| 20 | A | A | A | B | B | B | C | B | B | C | C | Comp. |
| 21 | A | A | A | A | A | A | A | A | A | A | A | Inv. |
| 22 | B | A | B | C | C | C | A | C | C | C | B | Comp. |
| 23 | B | B | A | B | B | B | C | A | A | C | C | Comp. |
| 24 | B | B | A | B | B | B | C | A | A | C | C | Comp. |
| 25 | B | B | A | B | B | B | C | A | A | C | C | Comp. |

TABLE 2-continued

| | Ink Evaluation | | Formed Image Evaluation | | | | | | | | |
|---|---|---|---|---|---|---|---|---|---|---|---|
| Ink No. | Nozzle Ink Repellency *2 | High Temperature Stability | Curability (*1) 15 | 40 | 100 | Cured Film Flexibility | Anti-abrasion Properties | Solvent Resistance | Weather Resistance | Substrate Adhesion Properties | Remarks |
| 26 | B | B | C | B | B | B | C | B | A | C | C | Comp. |
| 27 | A | A | A | A | A | A | A | A | A | A | A | Inv. |

(*1) Unit: mJ/cm², 
*2 Continuous Ejection Stability, Inv.: inventive Comp.: comparative The results described in Table 2 clearly show that any of the inks of the present invention exhibits excellent continuous ejection stability, storage stability, curability, flexibility, anti-abrasion properties, solvent resistance, and weather resistance, compared to the comparative inks. Further, it is obvious that any ink containing a VE compound according to the present invention as a main component, in which the halogen ion content falls within the range specified by the present invention, exhibits enhanced curability at the contact surface of the ink coated film and the substrate, as well as exhibiting excellent substrate adhesion properties, compared to the comparative examples.

Herein, any of the prepared inks of the present invention produced minimal odor during printing and curing and also printed matter had minimal odor.

Further, in evaluation of curability, evaluation at 55% RH and 20% RH in addition to 70% RH as a humidity ambience at 25° C. was carried out. Thereby, under any humidity ambience, the ink of the present invention was confirmed to exhibit excellent curability and to be hardly affected by humidity.

Example 2

<<Ink Preparation>>

Inks 28-44 each having the constitution listed in Table 3 were prepared in the same manner as in the preparation method of ink 9 described in Example 1.

Herein, in the same manner as in Example 1, a pigment and a disperser used in Example 2 were previously washed with ion-exchange water and dehydrated to dryness. Polymerizable compounds were previously distilled for purification and halogen ions were sufficiently eliminated. A photo-cationic polymerization initiator was washed with ion-exchange water and dehydrated to dryness. Further, the number of times of methanol washing and ion-exchange water washing was appropriately controlled to adjust thermally acid generating amount (the difference in hydrogen ion concentration (mol/L) in solutions before and after refluxing treatment when a dioxane solution of 0.02 mol/L of a photolytically acid generating agent is refluxed for 20 hours) at $1.0 \times 10^{-4}$ mol/L.

According to determination via an ion chromatographic method, the halogen ion content in any of inks 28-44 fell within the range of 1-10 μg/g of the ink.

The constitution of each ink is listed in Table 3.

TABLE 3

| | Pigment Dispersion | | | | Cationically Polymerizable Compound | | | | | | Radical Polymerization Inhibitor | | Cationic Polymerization | | |
|---|---|---|---|---|---|---|---|---|---|---|---|---|---|---|---|
| | | Pigment | | | Vinyl Ether | | | | | | | | | | |
| Ink No. | No. | Type | Added Amount | Disperser A | VE-1 | VE-1 | VE-3 | VE-4 | Others OXT | EP | *1 PI-1 | Type | Added Amount | Inhibitor 2MAE | Sensitizer DEA | Remarks |
| 9 | 4 | CB1 | 2.0 | 1.0 | 12 | 54.98 | 10 | 5 | 8 | 2 | 4.0 | — | — | 0.02 | 1.0 | Inv. |
| 28 | 4 | CB1 | 2.0 | 1.0 | 12 | 54.98 | 10 | 5 | 8 | 2 | 4.0 | — | — | 0.20 | 1.0 | Inv. |
| 29 | 4 | CB1 | 2.0 | 1.0 | 12 | 54.98 | 10 | 5 | 8 | 2 | 4.0 | RS1 | 0.02 | — | 1.0 | Inv. |
| 30 | 4 | CB1 | 2.0 | 1.0 | 12 | 54.98 | 10 | 5 | 8 | 2 | 4.0 | RS1 | 0.20 | — | 1.0 | Inv. |
| 31 | 4 | CB1 | 2.0 | 1.0 | 12 | 54.98 | 10 | 5 | 8 | 2 | 4.0 | RS2 | 0.02 | — | 1.0 | Inv. |
| 32 | 4 | CB1 | 2.0 | 1.0 | 12 | 54.98 | 10 | 5 | 8 | 2 | 4.0 | RS2 | 0.20 | — | 1.0 | Inv. |
| 33 | 4 | CB1 | 2.0 | 1.0 | 12 | 54.98 | 10 | 5 | 8 | 2 | 4.0 | RS3 | 0.02 | — | 1.0 | Inv. |
| 34 | 4 | CB1 | 2.0 | 1.0 | 12 | 54.98 | 10 | 5 | 8 | 2 | 4.0 | RS3 | 0.20 | — | 1.0 | Inv. |
| 35 | 4 | CB1 | 2.0 | 1.0 | 12 | 54.98 | 10 | 5 | 8 | 2 | 4.0 | RS4 | 0.02 | — | 1.0 | Inv. |
| 36 | 4 | CB1 | 2.0 | 1.0 | 12 | 54.98 | 10 | 5 | 8 | 2 | 4.0 | RS4 | 0.20 | — | 1.0 | Inv. |
| 37 | 4 | CB1 | 2.0 | 1.0 | 12 | 54.98 | 10 | 5 | 8 | 2 | 4.0 | RS5 | 0.02 | — | 1.0 | Inv. |
| 38 | 4 | CB1 | 2.0 | 1.0 | 12 | 54.98 | 10 | 5 | 8 | 2 | 4.0 | RS5 | 0.20 | — | 1.0 | Inv. |
| 39 | 4 | CB1 | 2.0 | 1.0 | 12 | 54.98 | 10 | 5 | 8 | 2 | 4.0 | RS6 | 0.02 | — | 1.0 | Inv. |
| 40 | 4 | CB1 | 2.0 | 1.0 | 12 | 54.98 | 10 | 5 | 8 | 2 | 4.0 | RS6 | 0.20 | — | 1.0 | Inv. |
| 41 | 4 | CB1 | 2.0 | 1.0 | 12 | 54.98 | 10 | 5 | 8 | 2 | 4.0 | RS7 | 0.02 | — | 1.0 | Inv. |
| 42 | 4 | CB1 | 2.0 | 1.0 | 12 | 54.98 | 10 | 5 | 8 | 2 | 4.0 | RS7 | 0.20 | — | 1.0 | Inv. |
| 43 | 4 | CB1 | 2.0 | 1.0 | 12 | 54.98 | 10 | 5 | 8 | 2 | 4.0 | RS8 | 0.02 | — | 1.0 | Inv. |
| 44 | 4 | CB1 | 2.0 | 1.0 | 12 | 54.98 | 10 | 5 | 8 | 2 | 4.0 | RS8 | 0.20 | — | 1.0 | Inv. |

*1 Photo-cationic Polymerization Initiator, Inv.: inventive

Herein, of all the additives used to prepare each of the inks abbreviated in Table 3, the additives other than those the details of whose abbreviations have been described in Example 1 are described below. Further, the added amount of each additive quantified in Table 3 is expressed by parts by mass.

(Radical Polymerization Inhibitors)
RS1: 4-hydroxy-2,2,6,6-tetramethylpiperidineoxyl free radical
RS2: 1,1-diphenyl-2-picrylhydrazyl
RS3: 2,6-di-t-butyl-4-methylphenol
RS4: IRGANOX1076 (hindered phenol-based compound, produced by Ciba Japan K.K.)
RS5: hydroquinone
RS6: phenothiazine
RS7: p-methoxyphenol
RS8: TINUVIN123 (hindered amine-based compound, produced by Ciba Japan K.K.)

<<Evaluation of the Inks>>

With regard to each of the prepared inks, nozzle ink repellency 2 and high temperature stability 2 were evaluated based on the following methods and continuous ejection stability was evaluated by the same evaluation method as described in Example 1.

(Evaluation of Nozzle Ink Repellency 2)

The nozzle plate member (exhibiting ink repellency) used for above piezo head 512SH was immersed in each ink at 70° C. for 7 days, and thereafter, whether or not the ink repellency was maintained was confirmed. Nozzle ink repellency 2 was evaluated based on the following criteria.

A: Ink repellencies of the nozzle plate before and after immersion in an ink were unchanged at all
B: Ink repellency was slightly degraded after immersion in an ink but was recovered by cleaning.
C: No ink repellency was expressed after immersion in an ink and was not recovered even by cleaning.

(Evaluation of High Temperature Stability 2)

Each ink was stored at 70° C. for 7 days and then the viscosity the was determined. High temperature stability 2 was evaluated based on the following criteria.

A: Viscosity variation rate before and after high temperature treatment is less than 5%.
B: Viscosity variation rate before and after high temperature treatment is 5%-less than 10%.
C: Viscosity variation rate before and after high temperature treatment is at least 10%.

<<Formed Image Evaluation>>

With regard to formed image evaluation, curability 2 was evaluated based on the following method. Other evaluations including cured film flexibility, anti-abrasion properties, solvent resistance, light stability, and substrate adhesion properties were conducted by the same methods as described in Example 1.

(Evaluation of Curability 2)

Under an ambience of 27° C. and 80% RH, a solid image of a film thickness of 7 μm was printed on polyethylene terephthalate film by ejecting each ink using piezo head 512SH (produced by Konica Minolta IJ Technologies, Inc.), followed by irradiation of each of the light intensities of 15, 40, and 100 mJ/cm$^2$ using a high pressure mercury lamp to form a cured film. The film surface immediately after curing was finger-touched to confirm the presence or absence of surface tackiness. Curability 2 was evaluated based on the following criteria.

A: No tackiness is noted.
B: Slight tackiness is noted.
C: Definite tackiness is noted.

The thus-obtained results are listed in Table 4.

TABLE 4

| | Ink Evaluation | | Formed Image Evaluation | | | | | | | | |
|---|---|---|---|---|---|---|---|---|---|---|---|
| Ink No. | *2 | Nozzle Ink Repellency 2 | High Temperature Stability 2 | Curability (*1) 15 | 40 | 100 | Cured Film Flexibility | Anti-abrasion Properties | Solvent Resistance | Weather Resistance | Substrate Adhesion Properties | Remarks |
| 9 | A | B | B | B | B | A | A | A | A | A | A | Inv. |
| 28 | A | B | B | B | B | A | A | A | A | A | A | Inv. |
| 29 | A | A | A | A | A | A | A | A | A | A | A | Inv. |
| 30 | A | A | A | A | A | A | A | A | A | A | A | Inv. |
| 31 | A | A | A | A | A | A | A | A | A | A | A | Inv. |
| 32 | A | A | A | A | A | A | A | A | A | A | A | Inv. |
| 33 | A | B | B | A | A | A | A | A | A | A | A | Inv. |
| 34 | A | A | A | A | A | A | A | A | A | A | A | Inv. |
| 35 | A | B | B | A | A | A | A | A | A | A | A | Inv. |
| 36 | A | B | B | A | A | A | A | A | A | A | A | Inv. |
| 37 | A | A | A | A | A | A | A | A | A | A | A | Inv. |
| 38 | A | A | A | A | A | A | A | A | A | A | A | Inv. |
| 39 | A | B | B | A | A | A | A | A | A | A | A | Inv. |
| 40 | A | A | A | A | A | A | A | A | A | A | A | Inv. |
| 41 | A | B | B | A | A | A | A | A | A | A | A | Inv. |
| 42 | A | B | B | A | A | A | A | A | A | A | A | Inv. |
| 43 | A | B | B | A | A | A | A | A | A | A | A | Inv. |
| 44 | A | B | B | A | A | A | A | A | A | A | A | Inv. |

(*1) Unit: mJ/cm$^2$
*2 Continuous Ejection Stability, Inv.: inventive

The results described in Table 4 clearly show that according to the ink of the present invention, there can be obtained an ink exhibiting decreased curability to a certain extent when a cationic polymerization inhibitor is added but exhibiting unaffected curability when a radical polymerization inhibitor is added, and exhibiting extremely excellent storage stability and curability, as well as excelling in other properties including continuous ejection stability, flexibility, anti-abrasion properties, solvent resistance, weather resistance, and substrate adhesion properties.

Herein, any of the prepared inks of the present invention produced minimal odor during printing and curing and also printed matter had minimal odor.

Example 3

<<Ink Preparation>>

Inks 45-48 each having the constitution listed in Table 5 were prepared in the same manner as in the preparation method of ink 8 described in Example 1. Herein, in the same manner as in Example 1, a pigment and a disperser used in Example 3 were previously washed with ion-exchange water and dehydrated to dryness. Polymerizable compounds were previously distilled for purification and halogen ions were sufficiently eliminated.

As a photo-cationic polymerization initiator, PI-2 (di(4-methoxyphenyl)(4-methylphenyl)sulfonium hexafluorophosphate) was washed with ion-exchange water and dehydrated to dryness. Further, the number of times of methanol washing and ion-exchange water washing was appropriately controlled to achieve the thermally acid generating amount described in Table 5. Herein, PI-2 was used for ink preparation in the forte of a solution (50% by mass solution) of di(4-methoxyphenyl)(4-methylphenyl)sulfonium hexafluorophosphate dissolved in propylene carbonate.

The halogen ion content in any of inks 45-48 fell within the range of 1-10 μg/g, based on determination via an ion chromatographic method.

excelling in other properties including continuous ejection stability, flexibility, anti-abrasion properties, solvent resistance, weather resistance, and substrate adhesion properties. With regard to this effect, it is presumed that radicals generated from a photo-cationic polymerization initiator when thermal decomposition slightly occurs during ink storage are inhibited, whereby radical polymerization is prevented during the storage.

Herein, any of the prepared inks of the present invention produced minimal odor during printing and curing and also printed matter had minimal odor.

What is claimed is:

1. An actinic energy radiation curable ink-jet ink comprising:
   a cationically polymerizable compound having a vinyl ether group in an amount of 50.0% or more by ink mass;
   a photo-cationic polymerization initiator having a thermally acid generating amount of $1\times10^{-4}$ mol/L or less; and
   a halogen ion in an amount of 1.0 μg/g ink to 100 μg/g ink.

2. The actinic energy radiation curable ink-jet ink of claim 1, wherein the content of the halogen ion is 1.0 μg/g ink or more and 40 μg/g ink or less.

TABLE 5

| | | Pigment Dispersion | | | Cationically Polymerizable Compound | | | | | | Cationic | | | Thermally | |
| | | Pigment | | Dis- | Vinyl Ether | | | | Others | | Photo-cationic | Polymerization | Sensi- | Acid | |
| Ink | | | Added | perser | Compound | | | | | | Polymerization | Inhibitor | tizer | Generating | Re- |
| No. | No. | Type | Amount | A | VE-1 | VE-1 | VE-3 | VE-4 | OXT | EP | PI-2 | 2MAE | DEA | Amount (*A) | marks |
| 45 | 4 | CB1 | 2.0 | 1.0 | 12 | 54.98 | 10 | 5 | 8 | 2 | 4.0 | 0.02 | 1.0 | 12 | Inv. |
| 46 | 4 | CB1 | 2.0 | 1.0 | 12 | 54.98 | 10 | 5 | 8 | 2 | 4.0 | 0.02 | 1.0 | 5 | Inv. |
| 47 | 4 | CB1 | 2.0 | 1.0 | 12 | 54.98 | 10 | 5 | 8 | 2 | 4.0 | 0.02 | 1.0 | 1 | Inv. |
| 48 | 4 | CB1 | 2.0 | 1.0 | 12 | 54.98 | 10 | 5 | 8 | 2 | 4.0 | 0.02 | 1.0 | 0.5 | Inv. |

(*A) Expressing the thermally generating acid amount of a used photo-cationic polymerization initiator (PI-2), (unit: $\times 10^{-4}$ mol/L)
Inv.: inventive <<Evaluation of the Inks and Formed Images>>

By the same method as described in Example 1, the inks and formed images were evaluated.

The obtained results are listed in Table 6.

3. The actinic energy radiation curable ink-jet ink of claim 1, wherein the content of the halogen ion is 1.0 μg/g ink or more and 10 μg/g ink or less.

TABLE 6

| | Ink Evaluation | | | Formed Image Evaluation | | | | | | | |
| Ink | Nozzle Ink | High Temperature | Curability (*1) | | | Cured Film | Anti-abrasion | Solvent | Weather | Substrate Adhesion | |
| No. | *2 Repellency | Stability | 15 | 40 | 100 | Flexibility | Properties | Resistance | Resistance | Properties | Remarks |
| 45 | A | B | B | A | A | A | A | A | A | A | A | Inv. |
| 46 | A | B | B | A | A | A | A | A | A | A | A | Inv. |
| 47 | A | A | A | A | A | A | A | A | A | A | A | Inv. |
| 48 | A | A | A | A | A | A | A | A | A | A | A | Inv. |

(*1) Unit: mJ/cm$^2$,
*2 Continuous Ejection Stability,
Inv.: inventive

The results described in Table 6 clearly show that according to the ink of the present invention, when the thermally acid generating amount of a photo-cationic polymerization initiator is allowed to be at most $1.0\times10^{-4}$ mol/L, there can be obtained an ink of the preferred embodiment exhibiting unaffected curability and improved storage stability, as well as 4. The actinic energy radiation curable ink-jet ink of claim 1, wherein the content of the cationically polymerizable compound having a vinyl ether group as a reactive group is 80.0 or more by mass.

5. The actinic energy radiation curable ink-jet ink of claim 1 comprising a radical polymerization inhibitor.

6. The actinic energy radiation curable ink-jet ink of claim 1, wherein a viscosity of the ink is not less than 2 and not more than 50 mPa·s at 25° C.

7. The actinic energy radiation curable ink-jet ink of claim 1, wherein a surface tension of the ink is not less than 22 and not more than 35 mN/m at 25° C.

8. The actinic energy radiation curable ink-jet ink of claim 1, wherein the photolytically acid generating agent has a purity of at least 80%.

9. A method for an inkjet recording comprising steps of:
jetting the actinic energy radiation curable ink-jet ink of claim 1 from an inkjet nozzle on a recording media; and
curing the actinic energy radiation curable ink-jet ink by irradiating the actinic energy ray.

10. The method of claim 9, wherein droplet amount of the ink ejected from each nozzle is 2-20 pl.

11. The method of claim 9 wherein the curing step comprises irradiating actinic energy radiation 0.001-2.0 seconds after ink deposition on the recording media and after completion of entire ink-jet recording, further irradiating actinic energy radiation to the deposited ink.

12. A printed matter recorded by the method for the inkjet recording of claim 9.

* * * * *